(12) United States Patent
Hong et al.

(10) Patent No.: US 12,032,492 B2
(45) Date of Patent: Jul. 9, 2024

(54) METHOD OF OPERATING STORAGE DEVICE AND METHOD OF OPERATING STORAGE SYSTEM USING THE SAME

(71) Applicant: SAMSUNG ELECTRONICS CO., LTD., Suwon-si (KR)

(72) Inventors: Seokgi Hong, Suwon-si (KR); Mingon Shin, Gwacheon-si (KR); Seungjae Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 17/816,249

(22) Filed: Jul. 29, 2022

(65) Prior Publication Data

US 2023/0128638 A1 Apr. 27, 2023

(30) Foreign Application Priority Data

Oct. 21, 2021 (KR) .................. 10-2021-0140749

(51) Int. Cl.
*G06F 12/14* (2006.01)
*H04L 9/08* (2006.01)

(52) U.S. Cl.
CPC ........ *G06F 12/1408* (2013.01); *H04L 9/0819* (2013.01); *G06F 2212/1052* (2013.01)

(58) Field of Classification Search
CPC .. G06F 12/1408; G06F 3/0622; G06F 3/0623; G06F 21/31; G06F 21/81; G06F 21/602; H04L 9/0819
See application file for complete search history.

(56) References Cited

U.S. PATENT DOCUMENTS

| | | | |
|---|---|---|---|
| 9,081,943 B2 * | 7/2015 | Nagai | G06F 12/1416 |
| 9,418,220 B1 * | 8/2016 | McKee | G06F 21/602 |
| 10,255,200 B2 | 4/2019 | Vichodes et al. | |
| 10,735,389 B2 | 8/2020 | Smith et al. | |
| 10,868,679 B1 * | 12/2020 | Van Antwerpen | G06F 3/0622 |
| 11,595,204 B2 * | 2/2023 | Tang | G06F 11/3034 |
| 11,675,504 B2 * | 6/2023 | Ju | G06F 12/0246 |
| | | | 711/164 |
| 2007/0110236 A1 | 5/2007 | Tada | |
| 2009/0271638 A1 | 10/2009 | Kawakami et al. | |
| 2013/0173931 A1 | 7/2013 | Tzafrir | |

(Continued)

FOREIGN PATENT DOCUMENTS

JP   H0983506 A   3/1997

*Primary Examiner* — Shanto Abedin
(74) *Attorney, Agent, or Firm* — Myers Bigel, P.A.

(57) ABSTRACT

In a method of operating a storage device including a plurality of storage regions, a first request is received. The first request is for a cryptographic erasure with respect to a first storage region. During a first time interval, a first encryption key corresponding to the first storage region is changed based on the first request. A second request is received. In response to receiving the second request within the first time interval, a region access signal is outputted. In response to determining, based on the region access signal, that the second request is associated with the first storage region, an execution of the second request is held. In response to determining, based on the region access signal, that the second request is associated with a second storage region among the plurality of storage regions, the second request is executed.

19 Claims, 20 Drawing Sheets

(56) References Cited

U.S. PATENT DOCUMENTS

| | | | |
|---|---|---|---|
| 2013/0238907 A1* | 9/2013 | Debout | H04L 9/0894 |
| | | | 713/193 |
| 2014/0137119 A1* | 5/2014 | Hyde | G06F 21/56 |
| | | | 718/100 |
| 2019/0087113 A1 | 3/2019 | Isozaki et al. | |
| 2019/0258729 A1* | 8/2019 | Jeon | G06F 12/0246 |
| 2019/0317688 A1* | 10/2019 | Cheon | G06F 3/0608 |
| 2019/0362081 A1* | 11/2019 | Kanno | G06F 3/067 |
| 2020/0233607 A1* | 7/2020 | Kudoh | G06F 3/0659 |
| 2020/0293206 A1* | 9/2020 | Isozaki | G06F 3/0622 |
| 2021/0110055 A1* | 4/2021 | Miller | H04L 63/10 |
| 2021/0216220 A1 | 7/2021 | Kim et al. | |

\* cited by examiner

FIG. 4C

| RANGE | NAMESPACE |
|-------|-----------|
| RNG11 | NS1 |
| RNG12 | NS2 |
| RNG13 | NS3 |
| RNG14 | NS4 |
| RNG15 | NS5 |
| ⋮ | ⋮ |

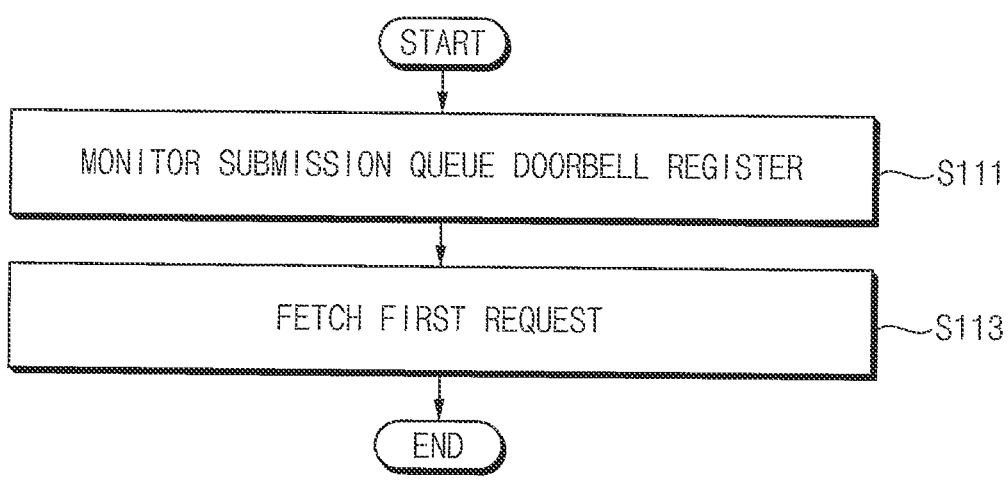

| RANGE | STR_LBA | END_LBA | ENC_KEY | KEY_CHNG_BIT |
|---|---|---|---|---|
| RNG11 | LBA1 | LBA4 | KEY1 | 1ST_LGLV |
| RNG12 | LBA5 | LBA8 | KEY2 | 1ST_LGLV |
| RNG13 | LBA9 | LBA12 | KEY3 | 2ND_LGLV |
| RNG14 | LBA13 | LBA16 | KEY4 | 2ND_LGLV |
| RNG15 | LBA17 | LBA20 | KEY5 | 1ST_LGLV |
| ⋮ | ⋮ | ⋮ | ⋮ | ⋮ |

| SUBMISSION QUEUE | START_LBA | END_LBA | 2ND_REQ |
|---|---|---|---|
| READ1 | LBA1 | LBA5 | PERFORMED |
| READ2 | LBA1 | LBA4 | PERFORMED |
| WRITE1 | LBA5 | LBA10 | SUSPENDED |
| READ3 | LBA8 | LBA14 | SUSPENDED |
| READ4 | LBA14 | LBA18 | SUSPENDED |
| WRITE2 | LBA17 | LBA19 | PERFORMED |
| WRITE3 | LBA16 | LBA17 | SUSPENDED |

FIG. 21

| RANGE | STR_LBA | END_LBA | ENC_KEY | KEY_CHNG_BIT |
|---|---|---|---|---|
| RNG1 | LBA1 | LBA2 | KEY4 | 1ST_LGLV |
| RNG2 | LBA3 | LBA4 | | |
| RNG3 | LBA5 | LBA6 | KEY5 | 2ND_LGLV |
| RNG4 | LBA7 | LBA8 | | |
| RNG5 | LBA9 | LBA10 | KEY6 | 1ST_LGLV |
| ⋮ | ⋮ | ⋮ | ⋮ | ⋮ |

METHOD OF OPERATING STORAGE DEVICE AND METHOD OF OPERATING STORAGE SYSTEM USING THE SAME

CROSS-REFERENCE TO RELATED APPLICATION

This U.S. non-provisional application claims priority under 35 USC § 119 to Korean Patent Application No. 10-2021-0140749, filed on Oct. 21, 2021, in the Korean Intellectual Property Office (KIPO), the disclosure of which is incorporated by reference herein in its entirety.

BACKGROUND

Example embodiments relate generally to semiconductor integrated circuits, and more particularly to a method of operating a storage device and a method of operating a storage system using the method.

Storage devices such as a solid state drive (SSD) using nonvolatile memories are widely used. The storage devices have advantages of excellent stability and durability, fast information access speed and low power consumption. The storage devices may be configured based on a plurality of protocols to improve performance. For example, the storage devices may be configured based on a nonvolatile memory express (NVMe) protocol using multi-queues for ultra-high-speed and large-capacity processing of data, and additionally, a trusted computing group (TCG) protocol for improved security performance of data. Based on the TCG protocol, the storage devices may encrypt data and write the encrypted data to certain storage regions of the storage devices, and change encryption keys used for the encryption to perform a cryptographic erasure on the written data. Based on the NVMe protocol, the storage devices can fetch multiple requests from host device in parallel and process the multiple requests at high speed. However, when the storage devices change the encryption keys to perform the cryptographic erasure, fetches for requests corresponding to storage regions unrelated to the cryptographic erasure may also blocked. Therefore, processing of the blocked requests cannot be performed normally.

SUMMARY

Some example embodiments may provide a method and an apparatus for a storage device, capable of normally performing write/read/erase operations of data and preventing deterioration in performance of the storage device.

According to example embodiments, in a method of operating a storage device including a plurality of storage regions, a first request is received. The first request is for a cryptographic erasure with respect to a first storage region among the plurality of storage regions. During a first time interval, a first encryption key corresponding to the first storage region is changed based on the first request. A second request is received. The second request includes at least one of a write request, a read request or an erase request. In response to receiving the second request within the first time interval, a region access signal representing whether the second request is associated with the first storage region is outputted. In response to determining, based on the region access signal, that the second request is associated with the first storage region, an execution of the second request is held until the first time interval has elapsed. In response to determining, based on the region access signal, that the second request is associated with a second storage region other than the first storage region among the plurality of storage regions, the second request is executed regardless of whether the first time interval has elapsed.

According to example embodiments, a storage system includes a host device and a storage device connected to each other based on a nonvolatile memory express (NVMe) protocol. The storage device includes a plurality of storage regions. In a method of operating the storage system, the host device issues a first request for a cryptographic erasure with respect to a first storage region among the plurality of storage regions. During a first time interval, the storage device, changes a first encryption key corresponding to the first storage region based on the first request. The host device issues a second request including at least one of a write request, a read request or an erase request. In response to receiving the second request within the first time interval, the storage device outputs a region access signal representing whether the second request is associated with the first storage region. In response to determining, based on the region access signal, that the second request is associated with the first storage region, the storage device postpones an execution of the second request until the first time interval has elapsed. In response to determining, based on the region access signal, that the second request is associated with a second storage region other than the first storage region among the plurality of storage regions, the storage device executes the second request regardless of whether the first time interval has elapsed.

According to example embodiments, a storage device includes a plurality of storage regions. In a method of operating the storage device, a first request is received. The first request is for a cryptographic erasure with respect to a first storage region among the plurality of storage regions. During a first time interval, a first encryption key is changed. The first encryption key corresponds to the first storage region based on the first request. A second request is received. The second request includes at least one of a write request, a read request or an erase request. In response to receiving the second request within the first time interval, a region access signal is outputted. The region access signal represents whether the second request is associated with the first storage region. In response to determining, based on the region access signal, that the second request is associated with the first storage region, an execution of the second request is held until the first time interval has elapsed. In response to determining, based on the region access signal, that the second request is associated with a second storage region other than the first storage region among the plurality of storage regions, the second request is executed regardless of whether the first time interval has elapsed. In the holding the execution of the second request, a generating of a write command, a read command an erase command are postponed based on the region access signal, or an encryption of write data is postponed and a decryption of read data is postponed based on the region access signal. The write command, the read command and the erase command corresponds to the write request, the read request and the erase request, respectively, associated with the second request and issued from a storage controller to nonvolatile memories. The write data corresponds to the write request in response to the second request including the write request. The read data corresponds to the read request in response to the second request including the read request.

BRIEF DESCRIPTION OF THE DRAWINGS

Example embodiments of the present disclosure will be more clearly understood from the following detailed description taken in conjunction with the accompanying drawings.

FIGS. 4A, 4B and 4C are diagrams for describing a plurality of storage regions included in the storage device in FIG. 2.

FIG. 6 is a diagram for describing a cryptographic erasure performed in the storage device of FIG. 2.

FIG. 7 is a flowchart illustrating an example of the receiving the first request in FIG. 1.

FIG. 21 is a diagram for describing a key changing table associated with the changing the first encryption key in FIG. 18.

DETAILED DESCRIPTION

Figure 1:
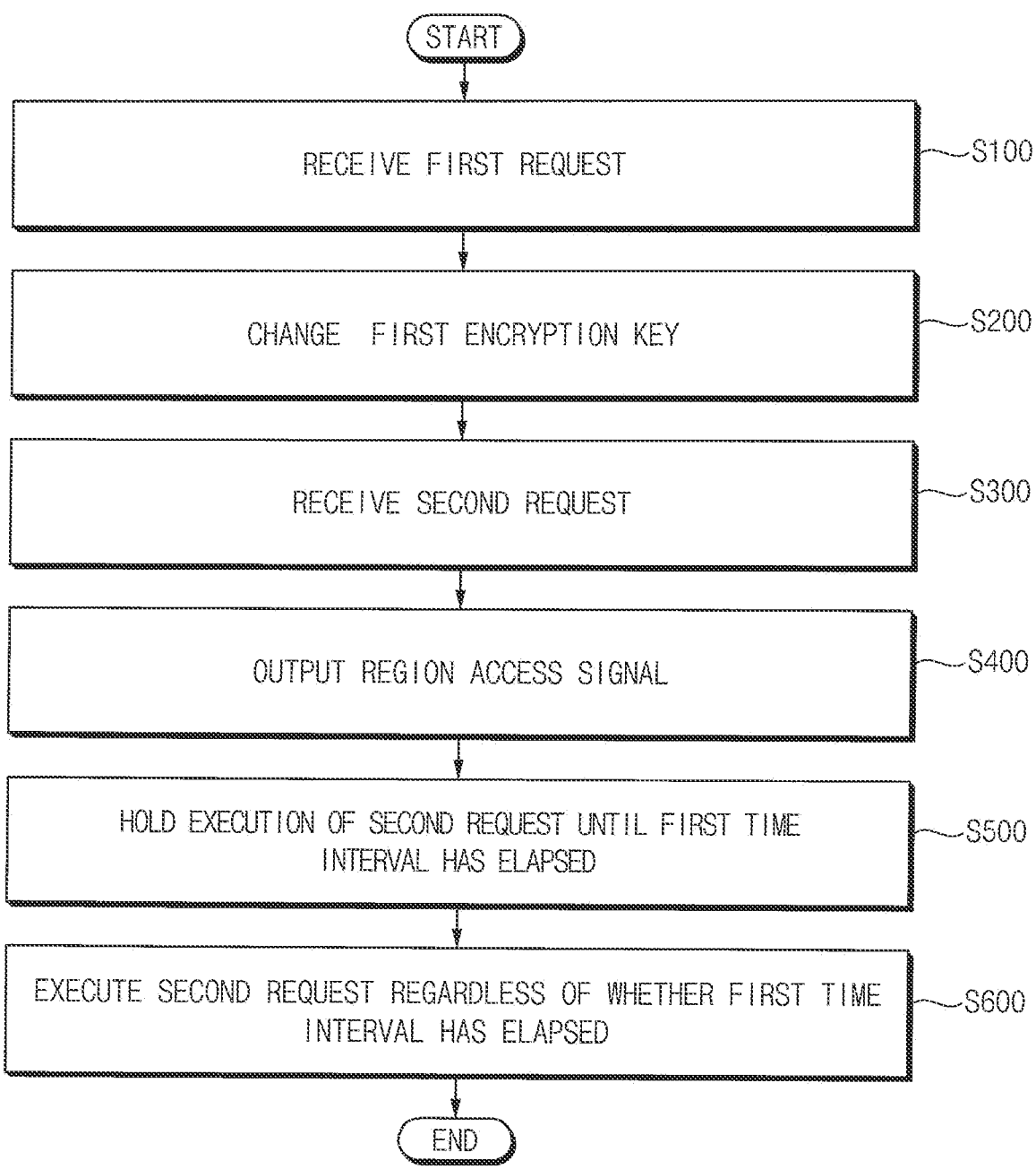
FIG. 1 is a flowchart illustrating a method of operating a storage device according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flowchart illustrating a method of operating a storage device according to example embodiments.

Referring to FIG. 1, a method of operating a storage device according to example embodiments may be performed using a storage device connected to a host device. The storage device may be configured based on a plurality of protocols to improve performance, and the host device and the storage device may communicate with each other based on the plurality of protocols. For example, the storage device may be configured based on a nonvolatile memory express (NVMe) protocol using multi-queues for ultra-high-speed and large-capacity processing of data, and additionally, a trusted computing group (TCG) protocol for improved security performance of data.

In the method of operating a storage device according to example embodiments, a first request for cryptographic erasure with respect to a first storage region among a plurality of storage regions of the storage device may be received (S100).

In some embodiments, the storage device may include a plurality of nonvolatile memories. The plurality of storage regions may be arbitrary regions in which memory regions in which the plurality of nonvolatile memories may store data are logically and/or physically divided.

In some embodiments, the host device may set the plurality of storage regions based on the plurality of protocols. For example, the host device may set the plurality of storage regions based on at least one of the TCG protocol and the NVMe protocol. When the plurality of storage regions are set based on the TCG protocol, the plurality of storage regions may be referred to as 'a plurality of ranges', and when the plurality of storage regions are set based on the NVMe protocol, the plurality of storage regions may be referred to as 'a plurality of namespaces'.

In some embodiments, the first storage region may include one or more storage regions among the plurality of storage regions, and for convenience of description, the first storage region may include one or more ranges of the plurality of ranges. However, the first storage region is not limited thereto. The first storage region may include one or more namespaces among the plurality of namespaces. The plurality of storage regions will be described below with reference to FIGS. 4A, 4B and 4C.

In some embodiments, the storage device may include a key changing table associated with the cryptographic erasure. The key changing table may include a plurality of address information, a plurality of encryption keys, and/or a plurality of key changing bits. Each of the plurality of address information may represent a respective storage region of the plurality of storage regions. Each of the plurality of encryption keys may be used to encrypt data written to a respective storage region of the plurality of storage regions. Each of the plurality of key changing bits may represent whether the cryptographic erasure is being executed on data in a respective storage region of the plurality of storage regions. The key changing table will be described below with reference to FIGS. 9 and 21.

In some embodiments, the cryptographic erasure may refer to an operation of generating substantially the same effect as erasing the written data by changing encryption keys used to encrypt encrypted data written in a certain storage region of the storage device based on the TCG protocol. The cryptographic erasure will be described below with reference to FIG. 6.

In some embodiments, the first request may be issued by the host device, and the storage device may receive the first request according to a scheme determined by the NVMe protocol. The receiving the first request will be described below with reference to FIG. 7.

During a first time interval, a first encryption key corresponding to the first storage region may be changed based on the first request (S200).

In some embodiments, the first time interval may be time interval from a first time point to a second time point. The first time point may be a time point at which the first request is received. The second time point may be a time point at which a change in a value of a predetermined register is completed after the first encryption key is changed to a second encryption key. For example, the predetermined register may be a completion queue doorbell register according to the NVMe protocol.

In some embodiments, by changing the first encryption key corresponding to the first storage region, the data written in the first storage region can no longer be decrypted, and thus may remain in the same state as if erased from the storage device.

A second request including at least one of a write request, a read request and an erase request may be received (S300).

In some embodiments, the second request may be issued by the host device, and the storage device may receive the second request according to a scheme determined by the NVMe protocol.

In some embodiments, the second request may be distinguished from the first request, and may be a different request from the request for cryptographic erasure. For example, the host device may issue the write request to request writing of data to the storage device, issue the read request to request reading of written data from the storage device, and issue the erase request to request erasing of written data in the storage device. The write/read request may be a page-by-page write/read request for requesting a page-by-page write/read request to the nonvolatile memories. The write/read request may be a request for performing a page-by-page write/read operation on the nonvolatile memories. The erase request may be a request for performing a block-by-block erase operation on the nonvolatile memories, and may be distinguished from the first request for requesting the cryptographic erasure for one or more ranges.

In response to receiving the second request within the first time interval, a region access signal representing whether the second request is associated with the first storage region may be outputted (S400).

In some embodiments, the region access signal may be a digital signal representing whether the second request is a request for the first storage region. For example, in response to the second request corresponding to a first logic level, it may represent that the second request is a request for a second storage region other than the first storage region. In response to the second request corresponding to a second logic level, it may represent that the second request is a request for the first storage region. However, a scheme of representing whether the second request is a request for the first storage region is a non-limiting example and may be variously changed.

In response to determining, based on the region access signal, that the second request is associated with the first storage region, an execution of the second request may be held (or postponed) until the first time interval has elapsed (S500).

In some embodiments, since the cryptographic erasure is being performed with respect to the first storage region, an execution of the second request associated with the first storage region may be held (or postponed). Holding the execution of the second request will be described below with reference to FIGS. 10, 11, 12, 13, 14, 15 and 16.

In response to determining, based on the region access signal, that the second request is associated with a second storage region other that the first storage region among the plurality of storage regions, the second request may be executed regardless of whether the first time interval has elapsed.

In some embodiments, since the second request is not a request for the first storage region, the second request may be performed even within the first time interval. Executing the second request will be described below with reference to FIGS. 10 and 17.

According to the above configuration, the storage device may normally process a second request corresponding to the second storage region that is not associated with the cryptographic erasure even while the cryptographic erasure with respect to the first storage region is being performed. The storage device may normally perform write/read/erase operations of data for the second storage region, thereby preventing deterioration in performance of the storage device that may occur according to the cryptographic erasure.

Figure 2:
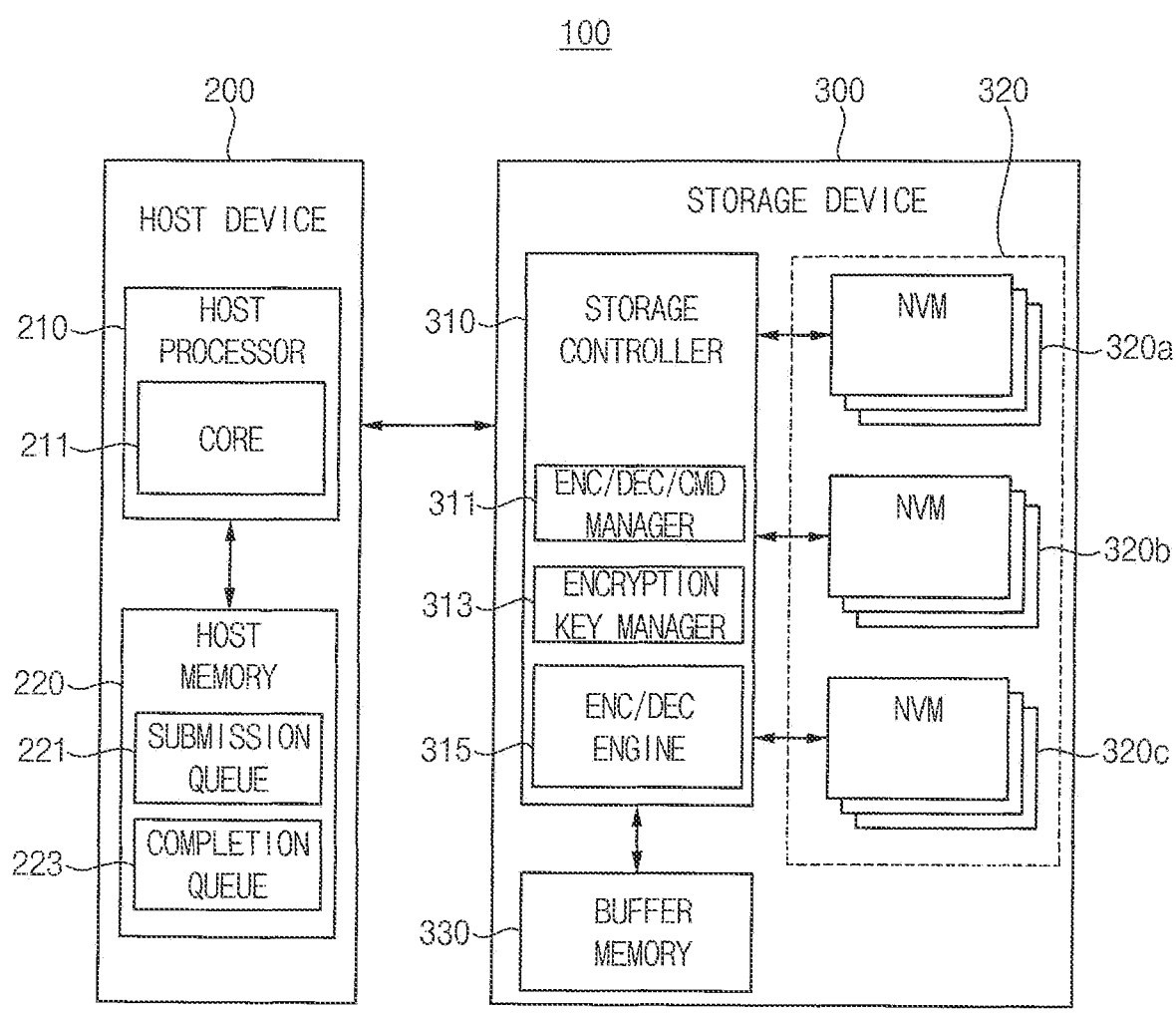
FIG. 2 is a block diagram illustrating a storage device and a storage system including the storage device according to example embodiments.

FIG. 2 is a block diagram illustrating a storage device and a storage system including the storage device according to example embodiments.

Referring to FIG. 2, a storage system 100 may include a host device 200 and a storage device 300.

The host device 200 may include a host processor 210 and a host memory 220, and control overall operations of the storage system 100. The host processor 210 may control operations of the host device 200 and execute, for example, an operating system (OS). The host memory 220 may store instructions and data executed and processed by the host processor 210. For example, the operating system executed by the host processor 210 may include a file system for file management and a device driver for controlling peripheral devices including the storage device 300 at the operating system level.

In some embodiments, the host processor 210 may include a core 211. The core 211 may be a single core as described below with reference to FIG. 13, a dual core as described below with reference to FIG. 20, and/or include three or more cores.

The storage device 300 may be accessed by the host device 200. The storage device 300 may include a storage controller 310, a plurality of nonvolatile memories 320a, 320b and 320c, and a buffer memory 330.

The storage controller 310 may control an operation of the storage device 300. For example, the storage controller 310 may control operations of the plurality of nonvolatile memories 320a, 320b and 320c based on requests REQ and data DAT received from the host device 200.

The plurality of nonvolatile memories 320a, 320b and 320c may store data.

In some embodiments, each of the plurality of nonvolatile memories 320a, 320b and 320c may include NAND flash memories. In other embodiments, each of the plurality of nonvolatile memories 320a, 320b and 320c may include EEPROM (Electrically Erasable Programmable Read-Only Memory), PRAM (Phase Change Random Access Memory), RRAM (Resistance Random Access Memory), NFGM (Nano Floating Gate Memory), PoRAM (Polymer Random Access Memory), MRAM (Magnetic Random Access Memory), FRAM (Ferroelectric Random Access Memory), or the like.

In some embodiments, a plurality of storage regions may be set with respect to the plurality of nonvolatile memories 320a, 320b and 320c. As will be described below with reference to FIGS. 4A, 4B and 4C, one range or one namespace may be set with respect to a portion of the plurality of nonvolatile memories 320a, 320b and 320c.

The buffer memory 330 may store commands and data executed and processed by the storage controller 310, and temporarily store data written or to be written in the plurality of nonvolatile memories 320a, 320b and 320c. For example, the buffer memory 330 may include a volatile memory, such as dynamic random access memory (DRAM).

The storage controller 310 may include an encryption/decryption/command (ENC/DEC/CMD) manager 311, an encryption key manager 313 and an encryption/decryption (ENC/DEC) engine 315, and the storage device 300 may perform the method of operating the storage device described above with reference to FIG. 1. For example, the encryption/decryption/command manager 311 may perform at least a portion of the S100, S300, S400 and S500 operations, the encryption key manager 313 may perform the S200 operation, and the encryption/decryption engine 315 may perform S500 and S600 operations of FIG. 1.

In some embodiments, the storage device 300 may be a solid state drive (SSD). In some embodiments, the storage device 300 may be a Universal Flash Storage (UFS), a Multi Media Card (MMC), or an embedded MMC (eMMC). In some embodiments, the storage device 300 may be implemented as a Secure Digital (SD) card, a micro SD card, a memory stick, a chip card, a Universal Serial Bus (USB) card, a smart card, a CF (Compact Flash) card, or the like.

In some embodiments, the storage device 300 may be connected to the host device 200 through a block accessible interface including an NVMe bus, and be accessed by the host device 200 in units of blocks through the block accessible interface.

In some embodiments, the storage system 100 may be any computing system, such as a personal computer (PC), a server computer, a data center, a workstation, a digital television and a set-top box, etc. In other embodiments, the storage system 100 may be any mobile system, such as a mobile phone, a smart phone, a tablet PC, a laptop computer, a Personal Digital Assistant (PDA), a Portable Multimedia Player (PMP), a digital camera, a camcorder, a portable game console, a music player, a video player, a navigation device, a wearable device, an Internet of Things (IoT) device, an e-book, a virtual reality (VR) device, an augmented reality (AR) device, a drone, etc.

Figure 3:
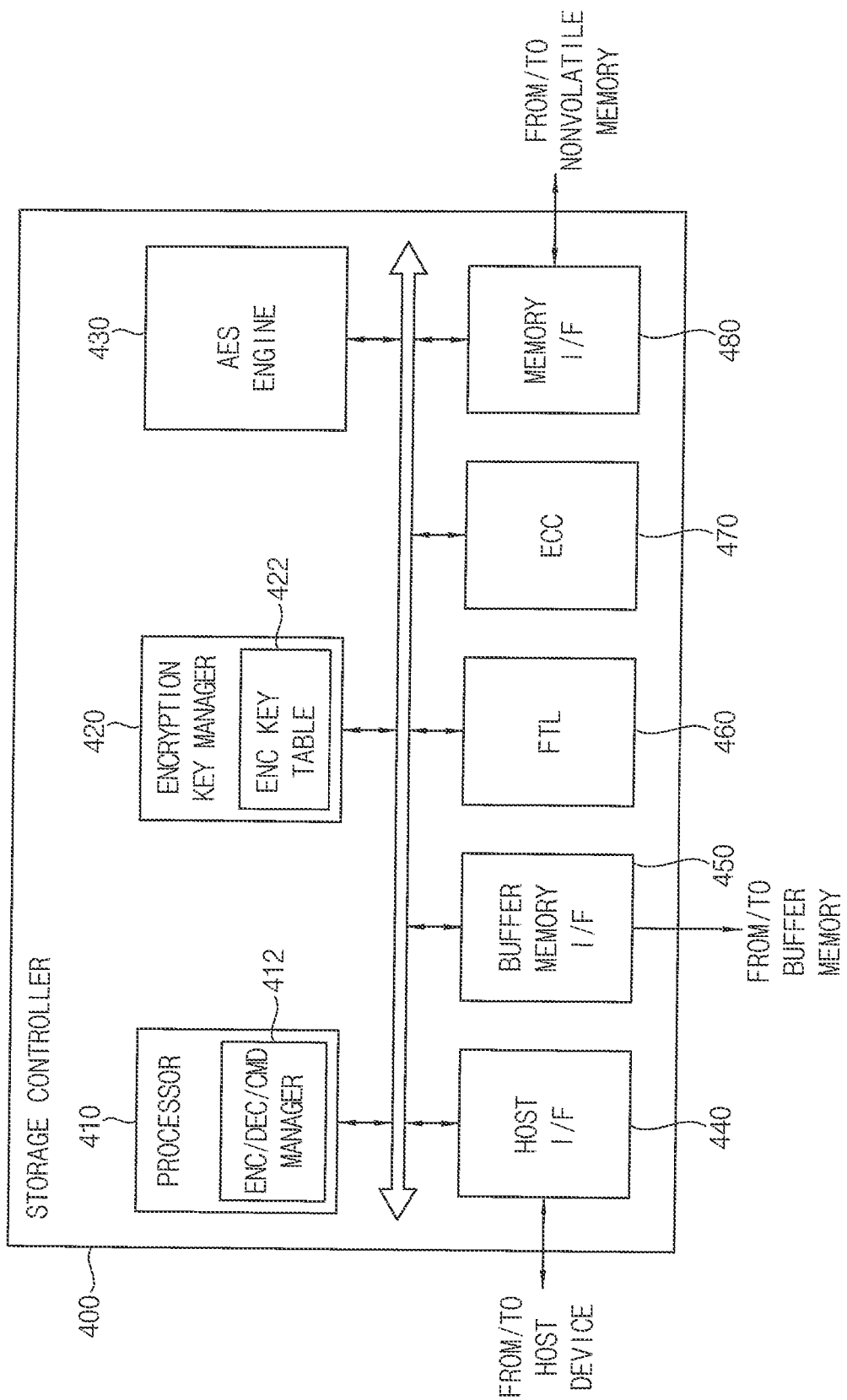
FIG. 3 is a block diagram illustrating an example of the storage controller in FIG. 2.

FIG. 3 is a block diagram illustrating an example of the storage controller in FIG. 2.

Referring to FIG. 3, a storage controller 400 may include a processor 410, an encryption key manager 420, an AES (advanced encryption standard) engine 430, a host interface 440, a buffer memory interface 450, a flash translation layer (FTL) 460, an ECC (error correction code) block 470 and a memory interface 480. The processor 410 may include an encryption/decryption/command (ENC/DEC/CMD) manager 412 and the encryption key manager 420 may include an encryption (ENC) key table 422. The encryption/decryption/command manager 412, the encryption key manager 420 and the AES engine 430 may correspond to the encryption/decryption/command manager 311, the encryption key manager 313 and the encryption/decryption engine 315 described above with reference to FIG. 2, respectively.

The processor 410 may control an operation of the storage controller 400 based on requests received from a host device, e.g., 200 in FIG. 2, through the host interface 440. For example, the processor 410 may control each configuration by employing a firmware for driving the storage device, e.g., 300 in FIG. 2. For example, when the encryption/decryption/command manager 412 receives an cryptographic erasure request, a write request, a read request and a erase request associated with a portion of a plurality of storage regions of the storage device from the host device, the encryption/decryption/command manager 412 may control the encryption key manager 420, the AES engine 430 the host interface 440 and the memory interface 480 such that various operations corresponding to the cryptographic erasure request, the write request, the read request and the erase request may be performed.

For example, when the encryption key manager 420 receives an cryptographic erasure request with respect to a portion of a plurality of storage regions of the storage device from the host device, the encryption key manager 420 may change a plurality of encryption keys corresponding to a storage region associated with the cryptographic erasure request and/or a plurality of key changing bits representing whether the cryptographic erasure is being performed, under a control of the encryption/decryption/command manager 412.

The AES engine 430 may perform encryption and decryption of data using an AES algorithm, and may further include a separate encryption module and/or a decryption module.

The FTL 460 may convert logical data addresses, e.g., logical block addresses (LBAs), provided from the host device into physical data addresses, e.g., physical block addresses (PBAs), using address mapping information.

The ECC block 470 for error correction may perform ECC encoding and/or ECC decoding using a coded modulation such as a Bose-Chaudhuri-Hocquenghem (BCH) code, a low density parity-check (LDPC) code, a turbo code, a Reed-Solomon code, a convolutional code, Recursive Systematic Code (RSC), Trellis-Coded Modulation (TCM), Block Coded Modulation (BCM), and/or other error correction codes.

The host interface 440 may provide a physical connection between the host device and the storage device. For example, the host interface 440 may provide interfacing with the storage device corresponding to a bus format of the host device. In some embodiments, the bus format of the host device may be peripheral component interconnect express (PCIe), NVMe, or the like.

The memory interface 480 may exchange data with nonvolatile memories, e.g., 320a, 320b and 320c in FIG. 2. The memory interface 480 may transmit data to the nonvolatile memories and receive data read from the nonvolatile memories. In some embodiments, the memory interface 480 may be connected to the nonvolatile memories through one channel. In other embodiments, the memory interface 480 may be connected to the nonvolatile memories through two or more channels.

Figure 4A:
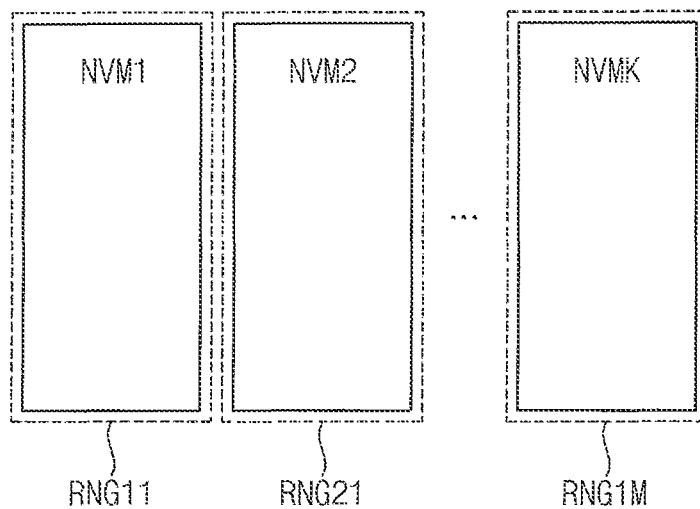
Figure 4B:
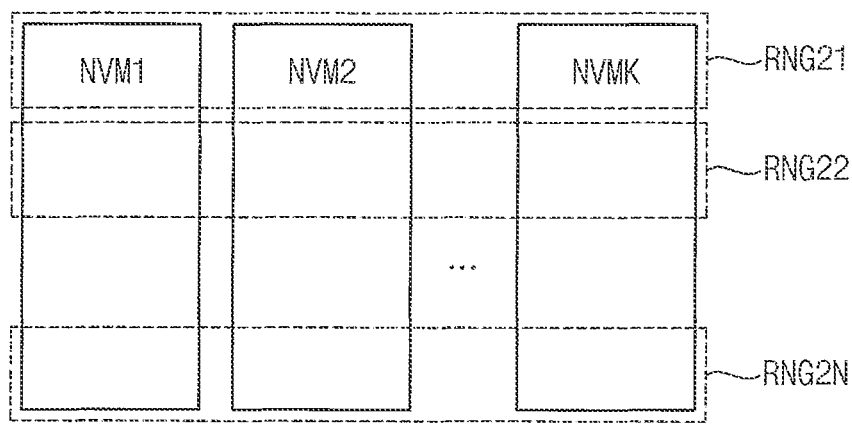

FIGS. 4A, 4B and 4C are diagrams for describing a plurality of storage regions included in the storage device in FIG. 2.

Referring to FIGS. 2, 4A and 4B, the host device 200 may set a plurality of storage regions with respect to a plurality of nonvolatile memories NVM1, NVM2, . . . , NVMK, where K is a natural number greater than or equal to two.

In an example illustrated in FIG. 4A, an entire region of one of the plurality of nonvolatile memories NVM1, NVM2, . . . , NVMK may be set to one of a plurality of storage regions, e.g., a plurality of ranges. For example, a first range RNG11 may be set with respect to an entire region of the nonvolatile memory NVM1, a second range RNG12 may be set with respect to an entire region of the nonvolatile memory NVM2, and a M-th range RNG1M may be set with respect to an entire region of the nonvolatile memory NVMK.

In an example illustrated in FIG. 4B, a portion of regions of the plurality of nonvolatile memories NVM1, NVM2, . . . , NVMK may be set to one of a plurality of storage regions, e.g., a plurality of ranges. For example, a fourth range RNG21 may be set with respect to a portion of regions of the plurality of nonvolatile memories NVM1, NVM2, . . . , NVMK, a fifth range RNG22 may be set with respect to another portion of regions of the plurality of nonvolatile memories NVM1, NVM2, . . . , NVMK, and a N-th range RNG2N may be set with respect to the other portion of regions of the plurality of nonvolatile memories NVM1, NVM2, . . . , NVMK. However, schemes of setting the plurality of storage regions are examples and are not limited thereto. In the examples illustrated in FIGS. 4A and 4B, the host device 200 sets the plurality of storage regions based on the TCG protocol, but in other embodiments, the host device 200 may set the plurality of storage regions based on the NVMe protocol. In this case, the plurality of storage regions may be referred to as a plurality of namespaces as described above with reference to FIG. 1. Also, the host device 200 may include a plurality of cores. In this case, each of the plurality of cores may independently set the plurality of storage regions, and overlapping storage regions may exist between the plurality of storage regions set by each of the plurality of cores.

In an example illustrate in FIG. 4C, when the host device 200 sets the plurality of storage regions, e.g., a plurality of ranges RNG11, RNG12, RNG13, RNG14, RNG15, . . . , and the host device 200 sets the plurality of storage regions, e.g., a plurality of namespaces NS1, NS2, NS3, NS4, NS5, . . . , a relationship between the plurality of ranges RNG11, RNG12, RNG13, RNG14, RNG15, . . . and the plurality of namespaces NS1, NS2, NS3, NS4, NS5, . . . is illustrated. However, the relationship is a non-limiting example, and the host device 200 may set the plurality of storage regions such that a plurality of namespaces correspond to a range, and also set the plurality of storage regions such that a plurality of ranges correspond to a namespace.

Figure 5:
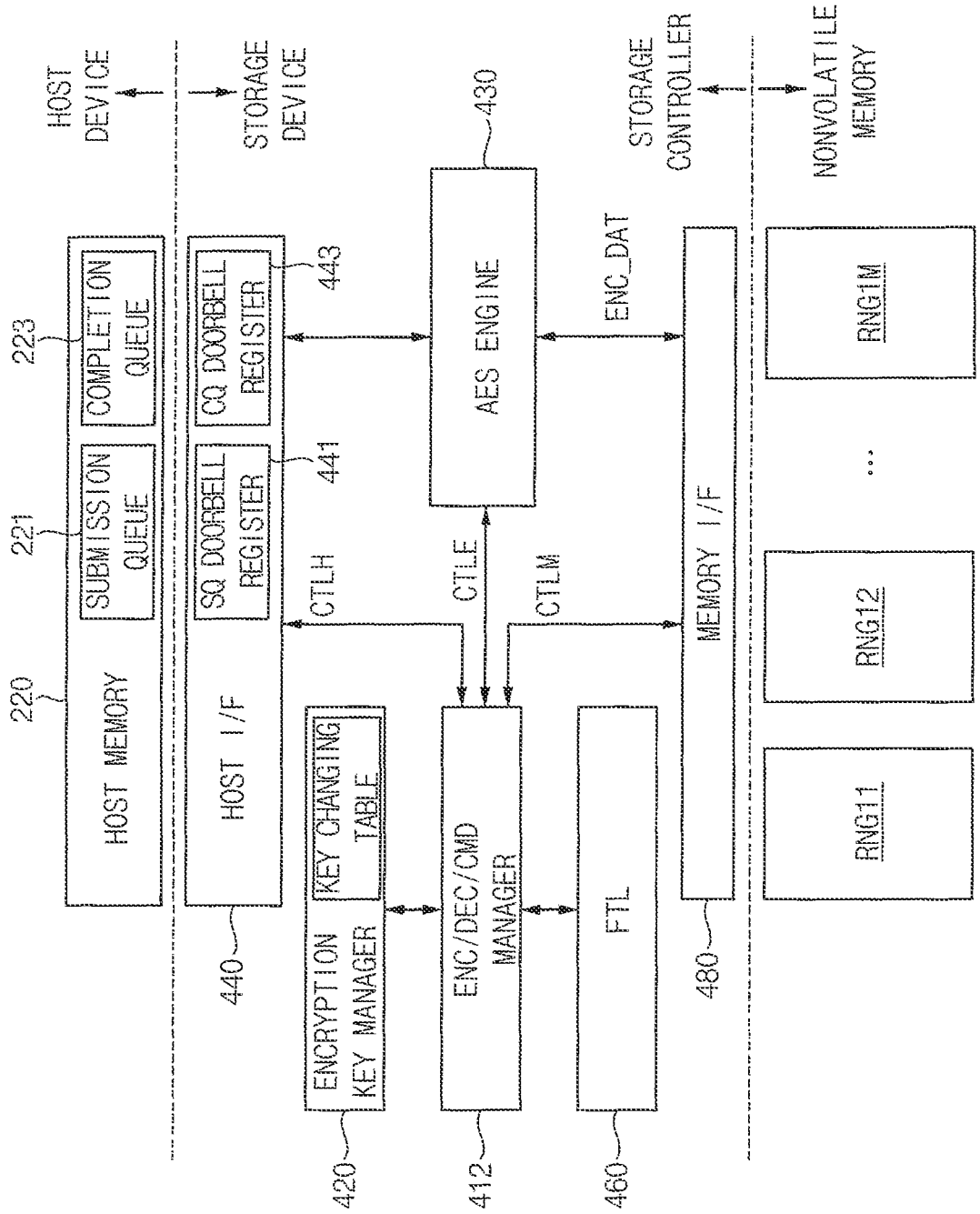
FIG. 5 is a block diagram illustrating an example of the storage system of FIG. 2.

FIG. 5 is a block diagram illustrating an example of the storage system of FIG. 2.

In FIG. 5, a host device and a storage device are illustrated. For convenience of description, only the host memory 220 among a plurality of components included in the host device, e.g., 200 in FIG. 2, is illustrated. Only the host interface 440, the encryption key manager 420, the encryption/decryption/command manager 412, the FTL 460, the AES engine 430 and the memory interface 480 and the plurality of storage regions RNG11, RNG12, RNG1M among a plurality of components included in the storage device, e.g., 400 in FIG. 3, are illustrated.

Referring to FIG. 5, the host memory 200 may include a submission queue 221 and a completion queue 223 based on a nonvolatile memory express (NVMe) protocol. The host interface 440 may include a submission queue doorbell register 441 and a completion queue doorbell register 443.

The host device may issue a cryptographic erasure request, a write request, a read request and an erase request to the storage device. A process in which requests issued by the host device are provided to the storage device based on the NVMe protocol will be described. The host device may include a single core, and the submission queue 221 and the completion queue 223 may be an input/output queue pair allocated to the single core.

Based on the NVMe protocol, the host device may insert a request to be issued into the submission queue 221 and change the value of the submission queue doorbell register 441. For example, the host device may increase the value stored in the submission queue doorbell register 441 after inserting the request into the submission queue 221.

The storage device may monitor the submission queue doorbell register 441. The storage device may fetch the request stored in the submission queue 221 based on a change in the value of the submission queue doorbell register 441.

The storage device may process the fetched request. When the processing of the fetched request is completed, the storage device may change the value of the completion queue doorbell register 443. For example, the storage device may increase the value stored in the completion queue doorbell register 443 when the processing of the fetched request is completed.

According to the process, the cryptographic erasure request, the write request, the read request and the erase request may be provided from the host device to the storage device. When the storage device receives requests including at least one of the cryptographic erasure request, the write request, the read request and/or the erase request from the host device, the encryption/decryption/command manager 412 may refer to address mapping information stored in the FTL 460, and address information, an encryption key and a key changing bit stored in the encryption key manager 420 based on the requests.

The encryption/decryption/command manager 412 may control the AES engine 430 based on the write request and the referenced information to perform encryption on write data corresponding to the write request, and provide the encrypted write data to nonvolatile memories through the memory interface 480.

The encryption/decryption/command manager 412 may control the AES engine 430 based on the read request and the referenced information to perform decryption on read data corresponding to the read request, and provide the decrypted read data to the host device through the host interface 440.

The encryption/decryption/command manager 412 may erase write data corresponding to the erase request based on the erase request and the referenced information. The encryption/decryption/command manager 412 may change an encryption key corresponding to the cryptographic erasure request based on the cryptographic erasure request and the referenced information.

The encryption/decryption/command manager 412 may generate at least one of control signals CTLH, CTLE and CTLM based on the cryptographic erasure request, the write request, the read request and/or the erase request. The encryption/decryption/command manager 412 may control the host interface 440 based on the control signal CTLH, may control the AES engine 430 based on the control signal CTLE, and may control the memory interface 480 based on the control signal CTLM. In some embodiments, the encryption/decryption/command manager 412 may generate a cryptographic erasure command corresponding to the cryptographic erasure request to provide the cryptographic erasure command to the AES engine 430, and the cryptographic erasure command may be included in the control signal CTLE. The encryption/decryption/command manager 412 may generate write/read commands corresponding to the write/read requests, respectively, and provide the write/read commands to the memory interface 480, and the write/read commands may be included in the control signal CTLM.

When requests including at least one of the write request, the read request and the erase request are received within a predetermined time interval, the encryption/decryption/command manager 412 may generate a region access signal representing whether the requests are with respect to a storage region in which the cryptographic erasure is performed.

FIG. 6 is a diagram for describing a cryptographic erasure performed in the storage device of FIG. 2.

In FIG. 6, it is illustrated whether a change in an encryption key ENC_KEY occurs based on a read request READ, a write request WRITE, an erase request ERASE or a cryptographic erasure request CRYPTOGRAPHIC ERASURE.

Referring to FIG. 6, when one of the read request READ, a write request WRITE and an erase request ERASE is issued from a host device, e.g., 200 in FIG. 2, an encryption key associated with storage regions corresponding to the issued request may not be changed. However, when the cryptographic erasure request CRYPTOGRAPHIC ERASURE is issued from the host device, an encryption key associated with storage regions corresponding to the issued request, e.g., the cryptographic erasure request, may be changed.

As described above with reference to FIG. 1, by changing the first encryption key based on the cryptographic erasure request, the data written in storage region corresponding to the cryptographic erasure request can no longer be decrypted, and thus may remain in the same state as erased from the storage device.

FIG. 7 is a flowchart illustrating an example of the receiving the first request in FIG. 1.

Referring to FIGS. 1, 5 and 7, in receiving a first request (S100), the storage device may monitor the submission queue doorbell register 441 (S111).

Based on a change in a value of the submission queue doorbell register 411, the storage device may fetch the first request stored in the submission queue 221 of the host device (S113).

In some embodiments, the first request may be a request for the cryptographic erasure with respect to a first storage region among a plurality of storage regions included in the storage device.

In some embodiments, the receiving the second request (S300) in FIG. 1 may also be performed in a manner similar to the receiving the first request (S100). Thus, the second request issued by the host device may also be provided to the storage device based on a scheme similar to S111 and S113.

Figures 8, 9:
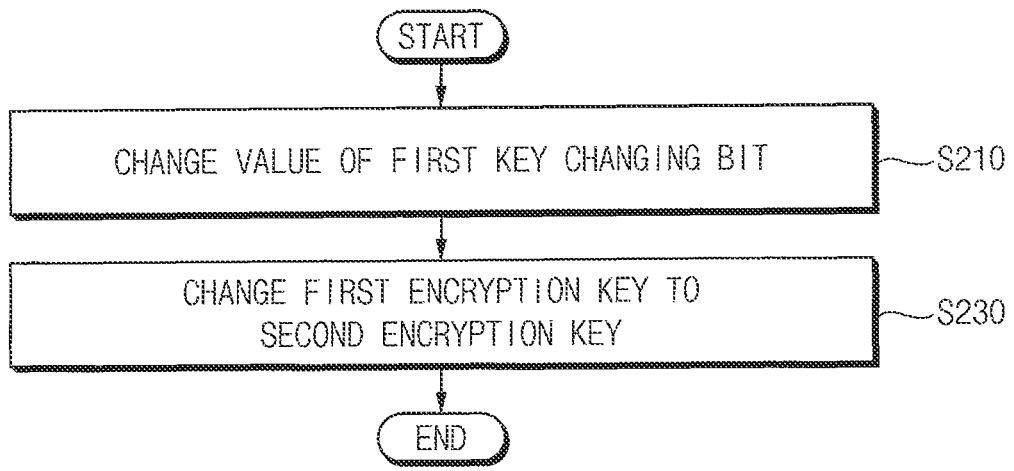
FIG. 8 is a flowchart illustrating an example of the changing the first encryption key in FIG. 1.
FIG. 9 is a diagram for describing a key changing table associated with the changing the first encryption key in FIG. 1.

FIG. 8 is a flowchart illustrating an example of the changing the first encryption key in FIG. 1.

Referring to FIGS. 1, 5 and 8, in changing a first encryption key (S200), the storage device may change a value of a first key changing bit corresponding to a first storage region among a plurality of key changing bits based on a first request (S210).

In some embodiments, the first request may be a request for a cryptographic erasure with respect to a first storage region among a plurality of storage regions included in the storage device.

In some embodiments, the plurality of key changing bits may be included in the key changing table described above with reference to FIG. 1, and the key changing table will be described below with reference to FIG. 9.

In some embodiments, by changing the value of the first key changing bit corresponding to the first storage region, it may be represented that the cryptographic erasure is being performed.

The storage device may change the first encryption key among a plurality of encryption keys to a second encryption key other than the first encryption key based on the first request (S230).

In some embodiments, by changing the first encryption key to the second encryption key, it may be represented that the cryptographic erasure is completed.

FIG. 9 is a diagram for describing a key changing table associated with the changing of the first encryption key in FIG. 1.

Referring to FIG. 9, a key changing table may include a plurality of address information, e.g., start addresses STR_LBA and end addresses END_LBA, a plurality of encryption keys ENC_KEY and a plurality of key changing bits KEY_CHNG_BIT. Each of the plurality of address information may represent a respective storage region of a plurality of storage region. Each of the encryption keys may be used to encrypt data written a respective storage region of the plurality of storage regions. Each of the plurality of key changing bits may represent whether a cryptographic erasure is being executed on data in a respective storage region of the plurality of storage regions.

In some embodiments, the key changing bit KEY_CHNG_BIT may have one of a first logic level 1ST_LGLV and a second logic level 2ND_LGLV. When the key changing bit KEY_CHNG_BIT corresponds to the first logic level 1ST_LGLV, it may represent that the cryptographic erasure of corresponding storage region RANGE is not being performed, and when the key changing bit KEY_CHNG_BIT corresponds to the second logic level 2ND_LGLV, it may represent that the cryptographic erasure of the corresponding storage region RANGE is being performed.

For example, a storage region RNG11 may be represented by a start address LBA1 and an end address LBA4, and data written to or read from the storage region RNG11 may be encrypted or decrypted using a first key KEY1. Data written to or read from storage regions RNG12, RNG13, RNG14, RNG15, . . . may also be encrypted or decrypted in a similar manner to the data written to or read from the storage region RNG11.

Since the value of the key changing bit KEY_CHNG_BIT corresponding to the storage region RNG11 corresponds to the first logic level 1ST_LGLV, it may be represented that the cryptographic erasure is not being performed with respect to the storage region RNG11. In the same manner as in the storage region RNG11, it may be represented that the cryptographic erasure is not being performed with respect to the storage regions RNG12 and RNG15, and it may be represented that the cryptographic erasure is being performed with respect to the storage regions RNG13 and RNG14.

Figure 10:
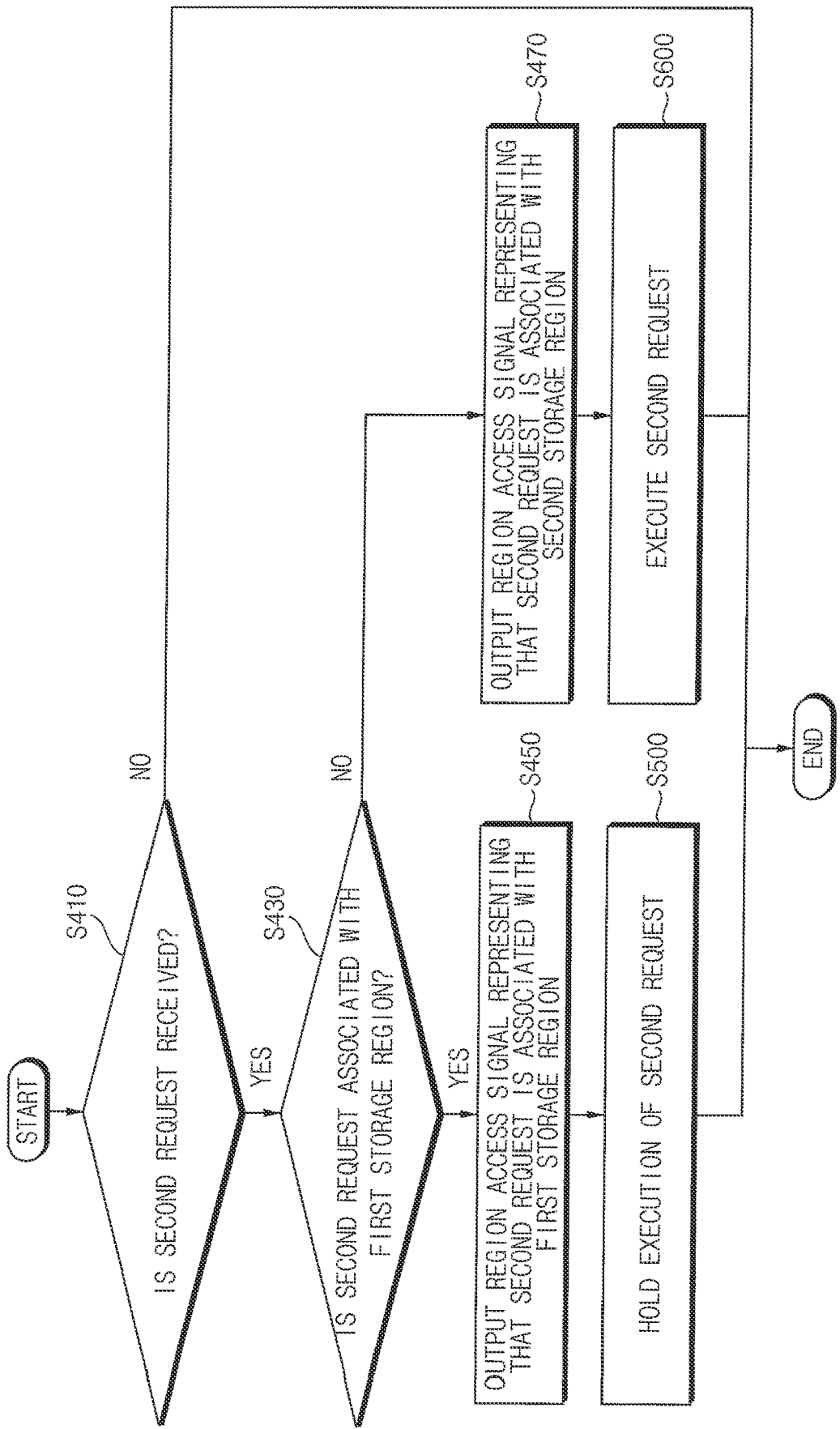
FIG. 10 is a flowchart illustrating an example of outputting a region access signal, holding the execution of the second request and the executing the second request in FIG. 1.

FIG. 10 is a flowchart illustrating an example of outputting a region access signal, holding the execution of the second request and the executing the second request in FIG. 1.

Referring to FIGS. 1, 5 and 10, the storage device may determine whether the second request is received within a first time interval (S410). In some embodiments, the second request may be distinguished from the first request, and may be a different request from the request for cryptographic erasure.

In response to receiving the second request within the first time interval (S410: YES), the storage device may determine whether the second request is associated with the first storage region (S430).

In some embodiments, the first time interval may be a time interval from a first time point to a second time point. The first time point may be a time point at which the first request is received, and the second time point may be a time point at which a change in a value of a predetermined register is completed after a first encryption key is changed to a second encryption key.

In some embodiments, whether the second request is associated with the first storage region may be determined based on first address information corresponding to the first storage region and second address information corresponding to the second request. The first address information may be included in the key changing table as described above with reference to FIG. 9. In some embodiments, each of the first address information and the second address information may include a start address STR_LBA and an end address END_LBA. In some embodiments, the storage device may generate the region access signal based on a result of the determination.

In response to the second request being associated with the first storage region (S430: YES), the storage device may output a region access signal representing that the second request is associated with the first storage region (S450). The storage device may hold an execution of the second request until the first time interval has elapsed (S500).

In response to the second request being not associated with the first storage region (S430: NO), the storage device may output a region access signal representing that the second request is associated with a second storage region (S470). The storage device may execute the second request regardless of whether the first time interval has elapsed (S600).

In response to the second request being received after the first time interval has elapsed (S410: NO), the storage device may not perform S430, S450, S470, S500 and S600. In this case, the storage device may perform the second request in a normal manner according to the NVMe protocol on which the storage device is based. Thus, as in S600, the storage device may perform the second request regardless of whether the first time period has elapsed.

Figure 11:
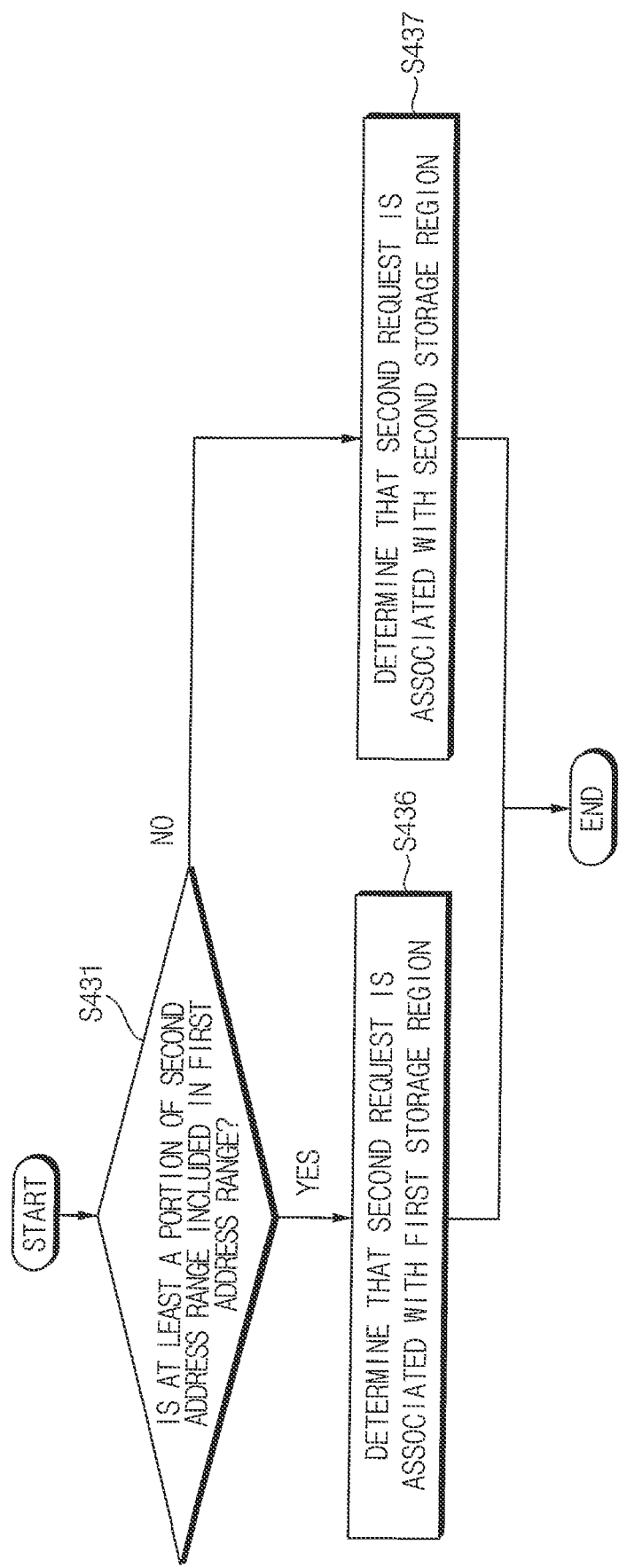
FIGS. 11 and 12 are flowcharts illustrating an example of determining whether the second request is associated with the first storage region in FIG. 1.
Figure 12:
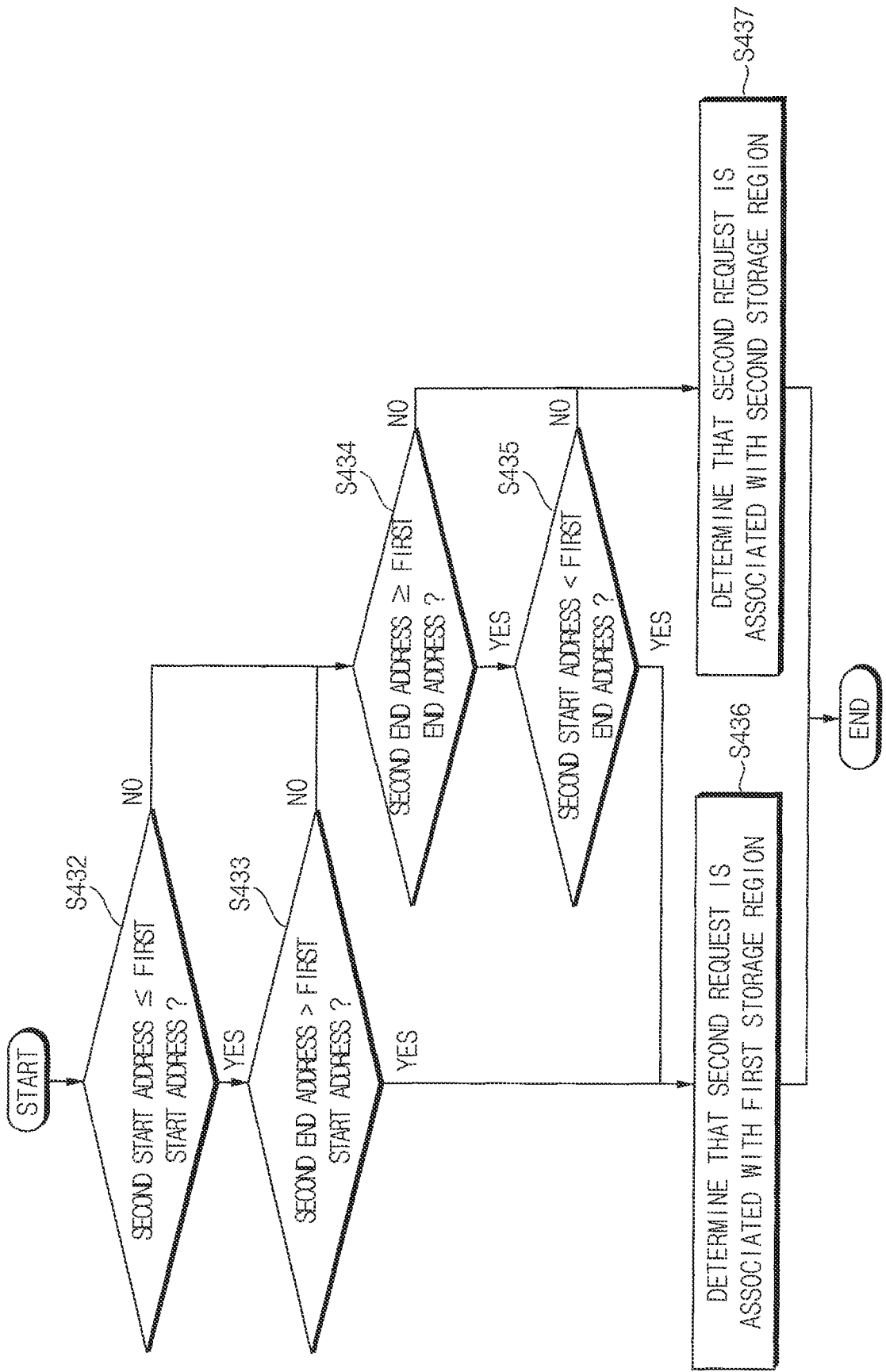

FIGS. 11 and 12 are flowcharts illustrating an example of determining whether the second request is associated with the first storage region in FIG. 1.

Referring to FIGS. 1, 10 and 11, the storage device may determine whether at least a portion of a second address range represented by second address information is included in a first address range represented by first address information (S431).

In response to at least a portion of the second address range being included in the first address range (S431: YES), the storage device may determine that the second request is associated with the first storage region (S436). In response to at least a portion of the second address range being not included in the first address range (S431: NO), the storage device may determine that the second request is not associated with the first storage region (S437).

Referring to FIGS. 1, 10, 11, and 12, the first address information may include a first start address and a first end address. The first start address and the first end address may represent a start address and an end address of the first storage region, respectively. The second address information may include a second start address and a second end address. The second start address and the second end address may represent a start address and an end address of nonvolatile memories accessed by the second request, respectively.

In response to the second start address being lower than or equal to the first start address (S432: YES) and the second end address being higher than the first start address (S433: YES), the storage device may determine that the second request is associated with the first storage region (S436).

In response to the second start address being higher than the first start address (S432: NO) or the second end address being lower than or equal to the first start address (S433: NO) and in response to the second end address being higher than or equal to the first end address (S434: YES) and the second start address being lower than the first end address (S435: YES), the storage device may determine that the second request is associated with the first storage region (S436).

In response to the second end address being lower than the first end address (S434: NO) or the second start address being higher than or equal to the first end address (S435: NO), the storage device may determine that the second request is not associated with the first storage region and/or determine that the second request is associated with the second storage region (S437).

In some embodiments, even when the second address range represented by the second address information is not included in the first address range represented by the first address information, by performing S432, S433, S434 and S435 operations, exceptionally, the storage device may determine that the second request is associated with the first storage region.

In some embodiments, only S432 and S433 with S431 may be performed, and in some embodiments, only S434 and S435 with S431 may be performed.

Figure 13:
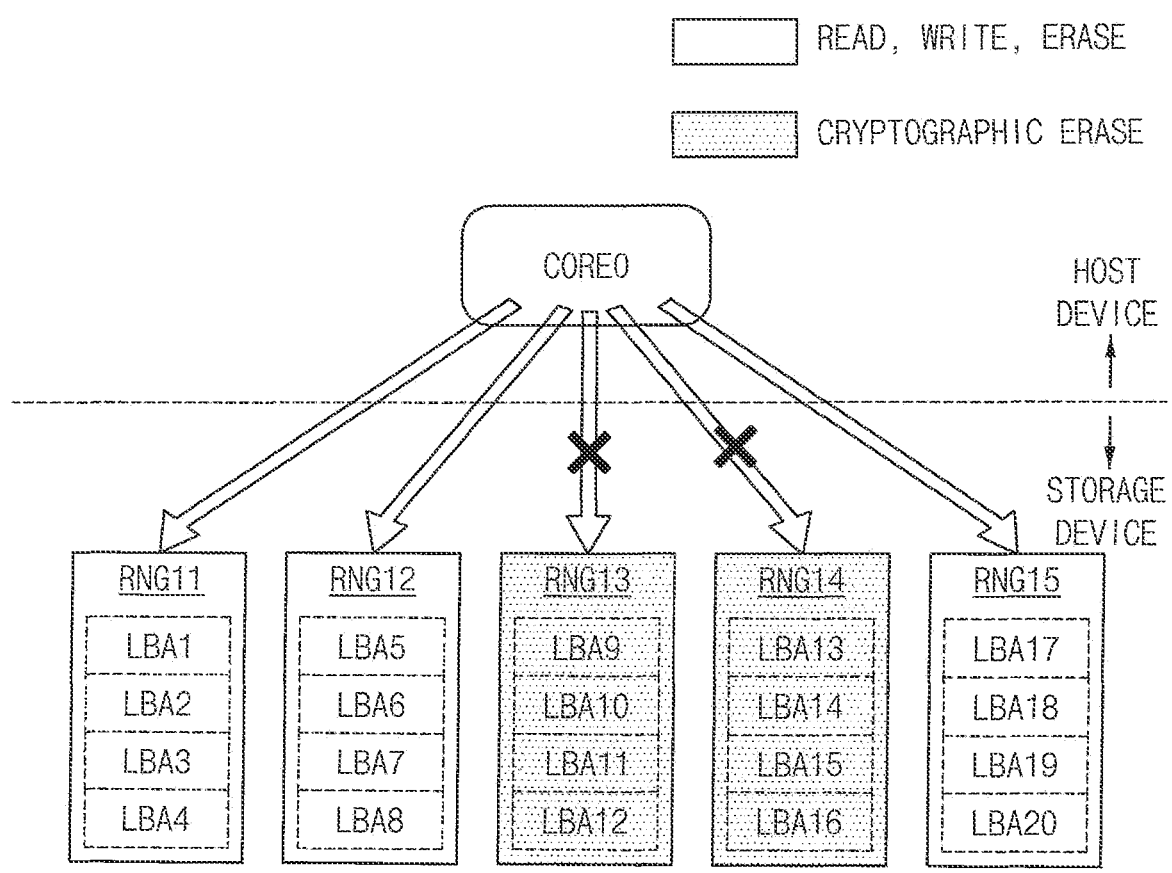
FIGS. 13 and 14 are diagrams for describing the holding the execution of the second request in FIG. 1.
Figures 14, 15:
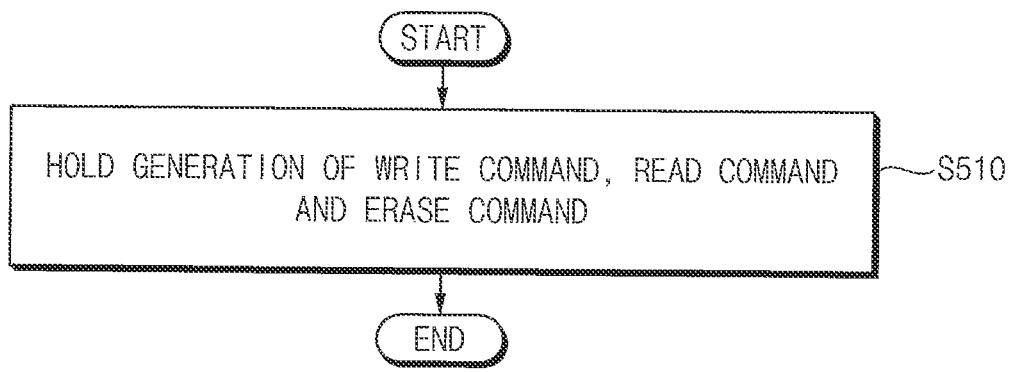
FIGS. 15 and 16 are flowcharts illustrating an example of the holding the execution of the second request in FIG. 1.

FIGS. 13 and 14 are diagrams for describing the holding the execution of the second request in FIG. 1.

Referring to FIG. 13, a host device may include a single core CORE0, and a storage device may include a plurality of ranges RNG11, RNG12, RNG13, RNG14 and RNG15 as a plurality of storage regions.

When the host device requests a cryptographic erasure with respect to the third and fourth ranges RNG13 and RNG14 among the plurality of ranges RNG11, RNG12, RNG13, RNG14 and RNG15, an execution of a first host request including write, read and erase requests associated with the third and fourth ranges RNG13 and RNG14 may be held (or postponed).

However, despite the cryptographic erasure, when the host device requests a second host request including write, read and erase requests associated with the first, second and fifth ranges RNG11, RNG12 and RNG15, the second host request may be performed normally.

Referring to FIGS. 13 and 14, read requests READ1, READ2, READ3 and READ4 and write requests WRITE1, WRITE2 and WRITE3 are illustrated. The ranges with respect to which the cryptographic erasure is requested correspond to the third and fourth ranges RNG13 and RNG14.

Even when address ranges corresponding to the write, read and erase requests include a portion of address ranges, e.g., LBA9, LBA10, LBA11, LBA12, LBA13, LBA14, LBA15 and/or LBA16, that represent the third and fourth ranges RNG13 and/or RNG14, an execution of the write, read and erase requests may be held (or postponed). For example, since address ranges corresponding to the read requests READ1 and READ2 and the write request WRITE2 do not include the address ranges, e.g., LBA9 to LBA16, that represent the third and fourth ranges RNG13 and RNG14, the read requests READ1 and READ2 and the write request WRITE2 may be performed normally. However, since address ranges corresponding to the read requests READ3 and READ4 and the write requests WRITE1 and WRITE3 include the address ranges that represent the third and fourth ranges RNG13 and RNG14, an execution of the read requests READ3 and READ4 and the write requests WRITE1 and WRITE3 may be held (or postponed).

Figure 16:
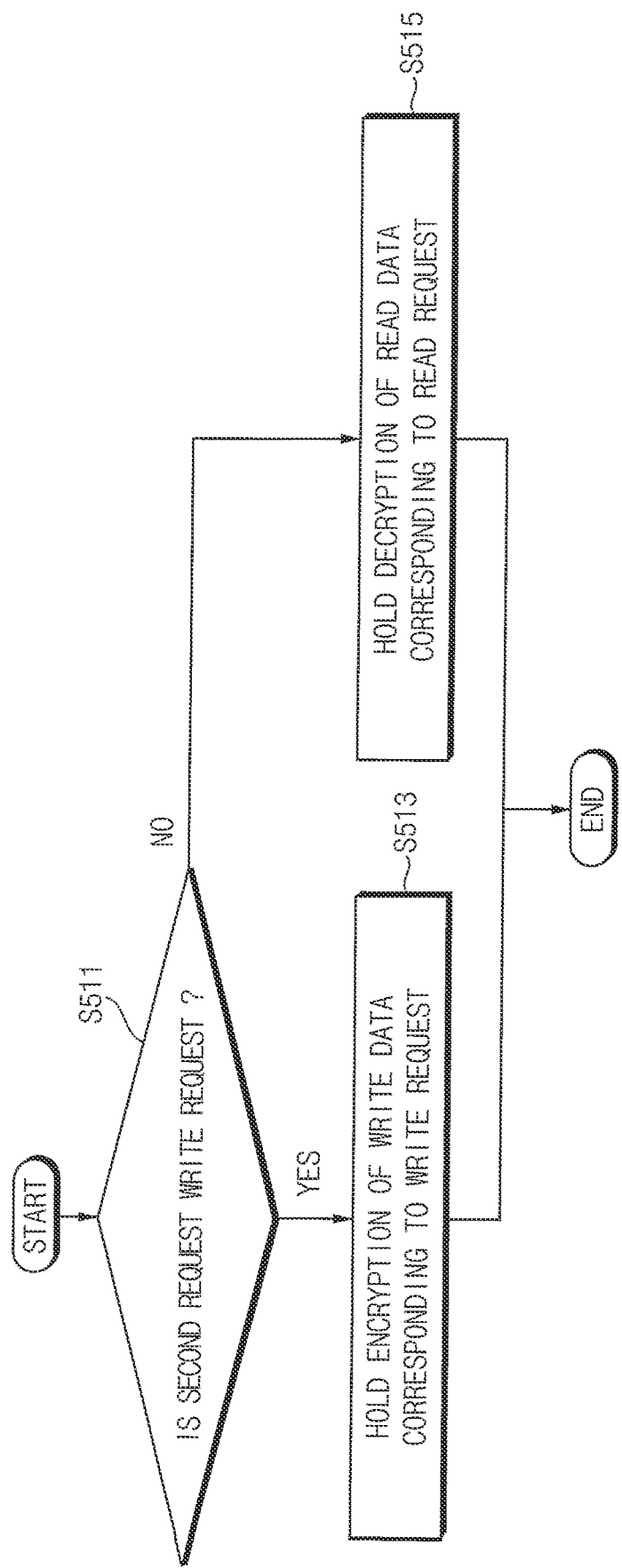

FIGS. 15 and 16 are flowcharts illustrating an example of the holding the execution of the second request in FIG. 1.

Referring to FIG. 15, in the holding the execution of the second request in FIG. 1, the storage device may hold a generation of a write command, a read command and an erase command that correspond to a write request, a read request and an erase request, respectively, based on a region access signal (S510). The write request, the read request and the erase request may be requests for executing the second request, and the write command, the read command and the erase command may be commands that a storage controller issues to nonvolatile memories.

Referring to FIG. 16, in the holding the execution of the second request in FIG. 1, in response to the second request including the write request (S511: YES), the storage device may hold an encryption of write data corresponding to the write request based on the region access signal (S513).

In response to the second request including the read request (S511: NO), the storage device may hold a decryption of read data corresponding to the read request based on the region access signal (S515).

In some embodiments, the storage device may hold the execution of the second request by holding generation of commands, such as the write command, the read command or the erase command, by performing S510.

In some embodiments, when one of the write request and the read request, other than the erase request, is issued from the host device, the storage device may hold the execution of the second request by holding the encryption and the decryption, by performing S513 and S515.

In some embodiments, the holding the execution of the second request may include at least one of, based on the region access signal, holding the generation of a write command, a read command and/or an erase command, and based on the region access signal, holding an encryption of write data and holding a decryption of read data. The write command, the read command and the erase command may correspond to the write request, the read request and the erase request, respectively, associated with the second request. The write command, the read command and the erase command may be issued from a storage controller to nonvolatile memories. The write data may correspond to the write request in response to the second request including the write request, and the read data may correspond to the read request in response to the second request including the read request.

Figure 17:
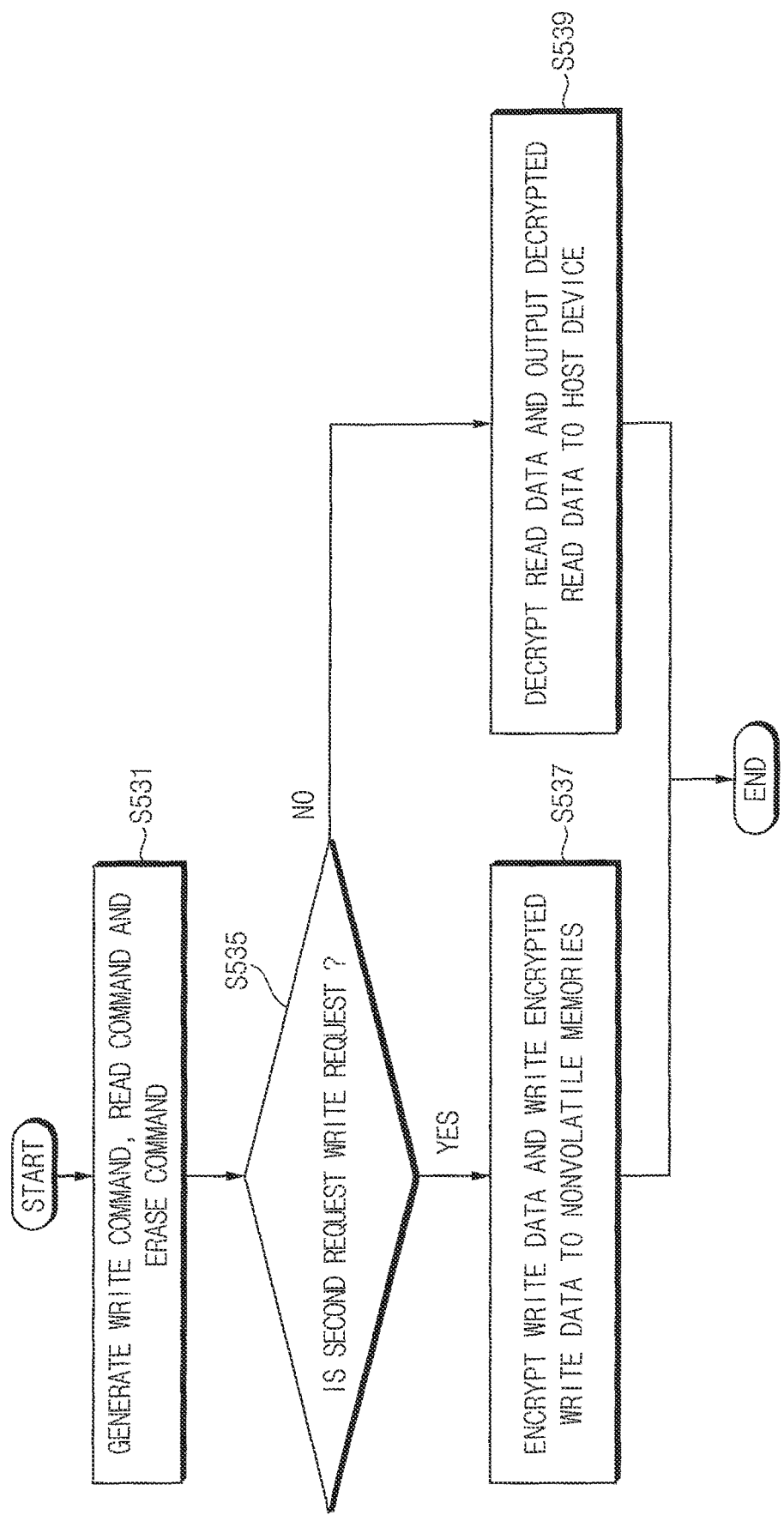
FIG. 17 is a flowchart illustrating an example of the execution of the second request in FIG. 1.

FIG. 17 is a flowchart illustrating an example of the execution of the second request in FIG. 1.

Referring to FIG. 17, in the executing the second request in FIG. 1, the storage device may generate a write command, a read command and an erase command associated with executing the second request based on a region access signal (S531).

In response to the second request including a write request (S535: YES), the storage controller may encrypt write data corresponding to the write request and write the encrypted write data to nonvolatile memories (S537).

In response to the second request including a read request (S535: NO), the storage controller may decrypt read data corresponding to the read request and output the decrypted read data to a host device (S539).

Figure 18:
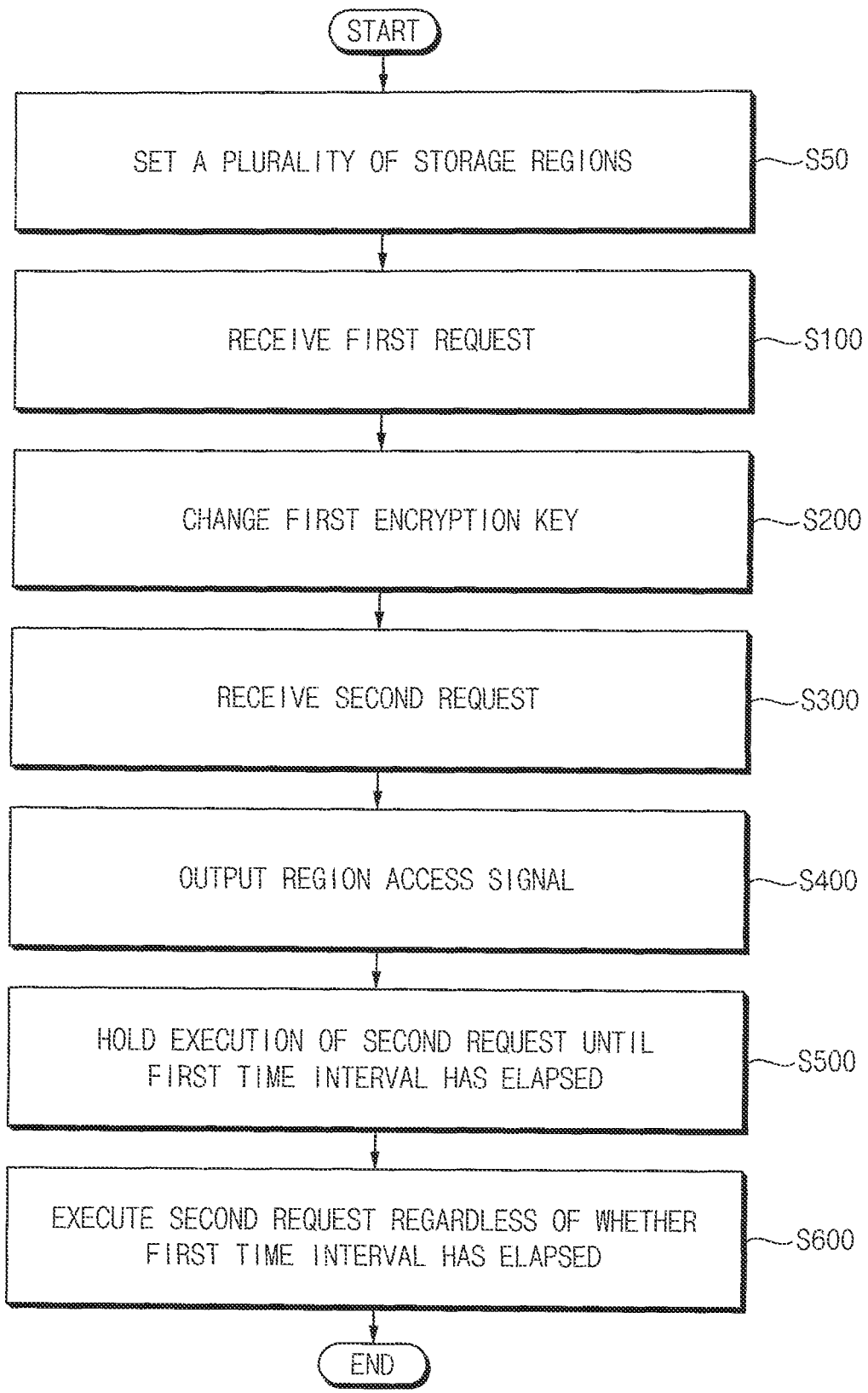
FIG. 18 is a flowchart illustrating a method of operating a storage system according to example embodiments.

FIG. 18 is a flowchart illustrating a method of operating a storage system according to example embodiments.

A method of operating a storage system of FIG. 18 may further include S50 operation compared to the method of operating the storage device of FIG. 1. Thus, duplicate descriptions of the same operations will be omitted.

Referring to FIG. 18, in the method of operating the storage system, the host device may set a plurality of storage regions, such as based on one of a TCG protocol and an NVMe protocol, (S50).

When the plurality of storage regions are set based on the TCG protocol, the plurality of storage regions may be referred to as 'a plurality of ranges' and when the plurality of storage regions are set based on the NVMe protocol, the plurality of storage regions may be referred to as 'a plurality of namespaces'.

In some embodiments, the cryptographic erasure described above with reference to FIG. 1 may be requested with respect to one or more storage regions among the plurality of storage regions. In this case, with respect to the storage regions for which the cryptographic erasure is requested, an execution of additional write request, read request and erase request may be held (or postponed) until the first time interval has elapses. The first time interval may be a sufficient time interval to complete the cryptographic erasure. However, the write request, the read request and the erase request may be normally performed associated with storage regions other that the storage regions for which the cryptographic erasure is requested.

Figure 19:
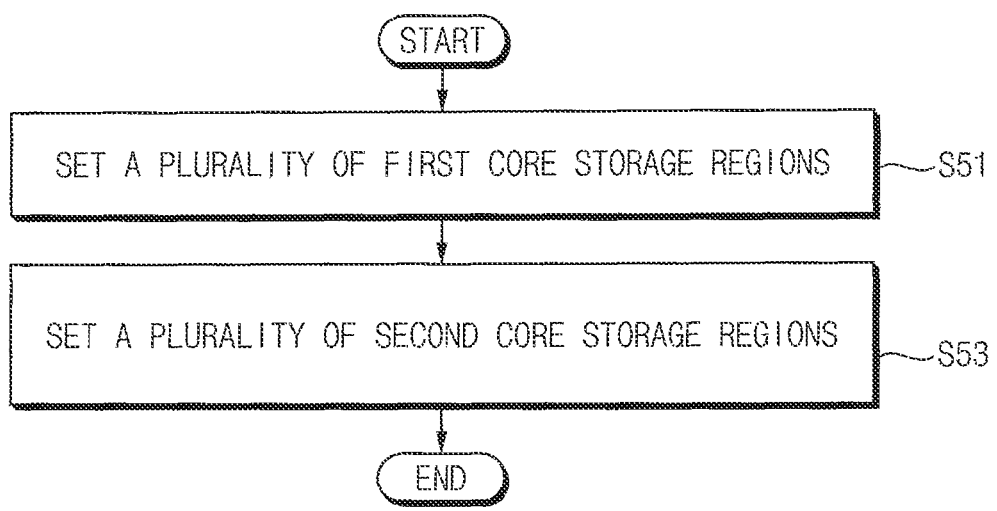
FIG. 19 is a flowchart illustrating an example of setting a plurality of storage regions in FIG. 18.

FIG. 19 is a flowchart illustrating an example of setting a plurality of storage regions in FIG. 18.

Referring to FIG. 19, in the setting the plurality of storage regions in FIG. 19, the first core may set a plurality of first core storage regions with respect to the storage device (S51). The second core may set a plurality of second core storage regions overlapping with a portion of the first core storage regions with respect to the storage device (S53).

As described above with reference to FIG. 2, the host device may have a dual core. In this case, the host device may include the first core and the second core.

In some embodiments, as in S51 and S53, each of the first core and the second core may set a plurality of storage regions with respect to the storage device, e.g., the first core storage regions and the second core storage regions. In this case, the first core and the second core may share the same storage regions, e.g., one range, among the plurality of storage regions. Thus, the first core may issue the first request described above with reference to FIG. 1, to the overlapping storage region, and the second core may issue the second request described above with reference to FIG. 1 to the overlapping storage region.

Figure 20:
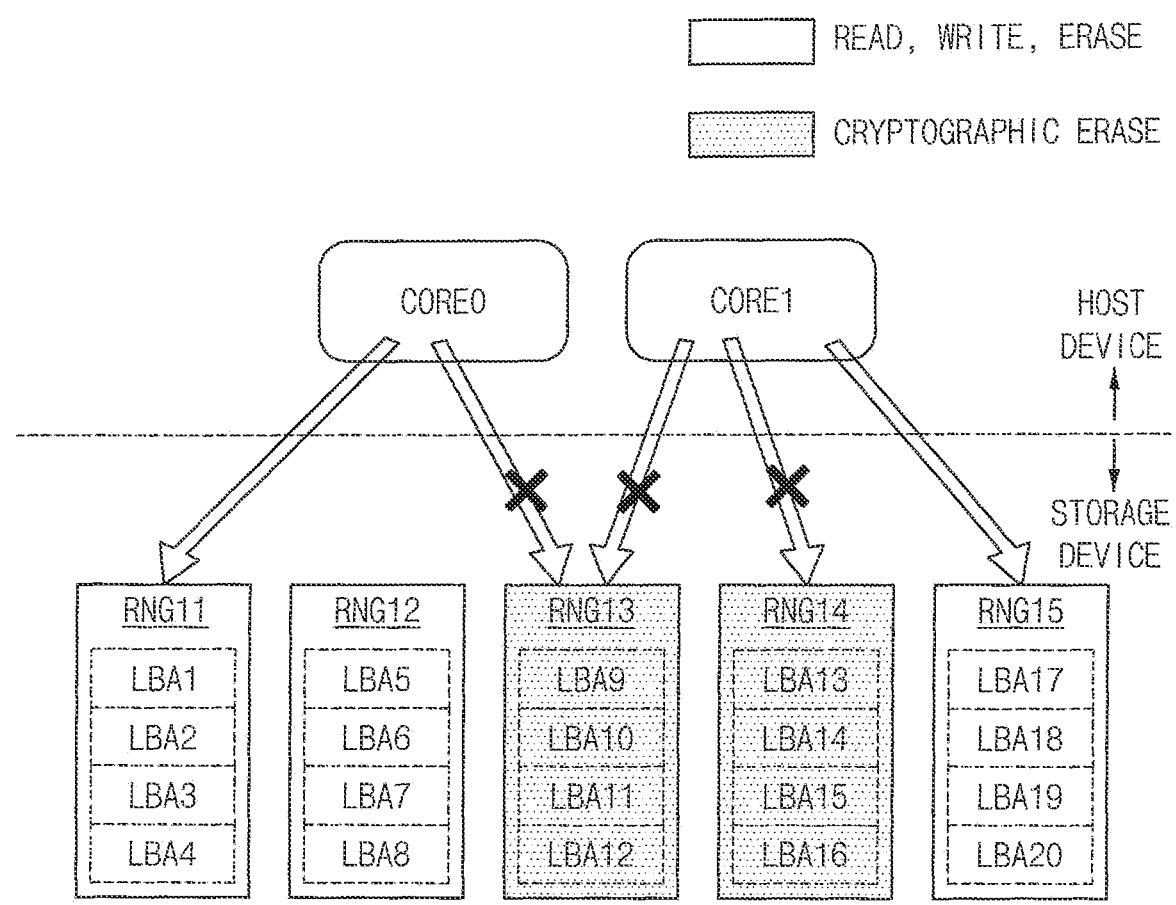
FIG. 20 is a diagram for describing the holding the execution of the second request in FIG. 18.

FIG. 20 is a diagram for describing the holding the execution of the second request in FIG. 18.

Referring to FIG. 20, a host device may include dual cores CORE0 and CORE1, and a storage device may include a plurality of ranges RNG11, RNG12, RNG13, RNG14 and RNG15.

When the host device requests a cryptographic erasure with respect to the third and fourth ranges RNG13 and RNG14 among the plurality of ranges RNG11, RNG12, RNG13, RNG14 and RNG15, an execution of a third host request including write, read and erase requests associated with the third and fourth ranges RNG13 and RNG14 may be held (or postponed).

However, despite the cryptographic erasure, when the host device requests a fourth host request including write, read and erase requests associated with the first, second and fifth ranges RNG11, RNG12 and RNG15, the fourth host request may be performed normally.

As described above with reference to FIG. 19, when the first core CORE0 requests the cryptographic erasure with respect to the third and fourth ranges RNG13 and RNG14, and when the second core CORE1 issues at least one of write, read and erase requests associated with the third and fourth ranges RNG13 and RNG14 in a state in which the cryptographic erasure is not completed, an execution of the write, read and erase requests issued by the second core CORE1 may be held (or postponed) by the cryptographic erasure executed by the first core CORE0. However, the write, read and erase requests issued by the dual cores CORE0 and CORE1 with respect to ranges other than the third and fourth ranges RNG13 and RNG14 may be performed normally.

FIG. 21 is a diagram for describing a key changing table associated with the changing the first encryption key in FIG. 18.

Referring to FIG. 21, a key changing table may include a plurality of address information, e.g., start addresses STR_LBA and end addresses END_LBA, a plurality of encryption keys ENC_KEY and a plurality of key changing bits KEY_CHNG_BIT. Duplicate descriptions of the same configurations as that of FIG. 9 will be omitted.

In some embodiments, even though a storage region RNG1 and a storage region RNG2 are set as different storage regions by a host device, the storage region RNG1 and the storage region RNG2 may be encrypted or decrypted with the same encryption key, e.g., an encryption key KEY4. Similarly, even though a storage region RNG3 and a storage region RNG4 are set as different storage regions by the host device, the storage region RNG3 and the storage region RNG4 may be encrypted or decrypted with the same encryption key, e.g., an encryption key KEY5. As such, the storage device and the storage system according to example embodiments may encrypt or decrypt different storage regions with the same encryption key. In some embodiments, the first storage region described above with reference to FIG. 1 may be all of the storage regions, e.g., RNG1 and RNG2, corresponding to the single encryption key. In other embodiments, the first storage region may be only a portion of the storage regions, e.g., one of RNG1 and RNG2, corresponding to the single encryption key.

Figure 22:
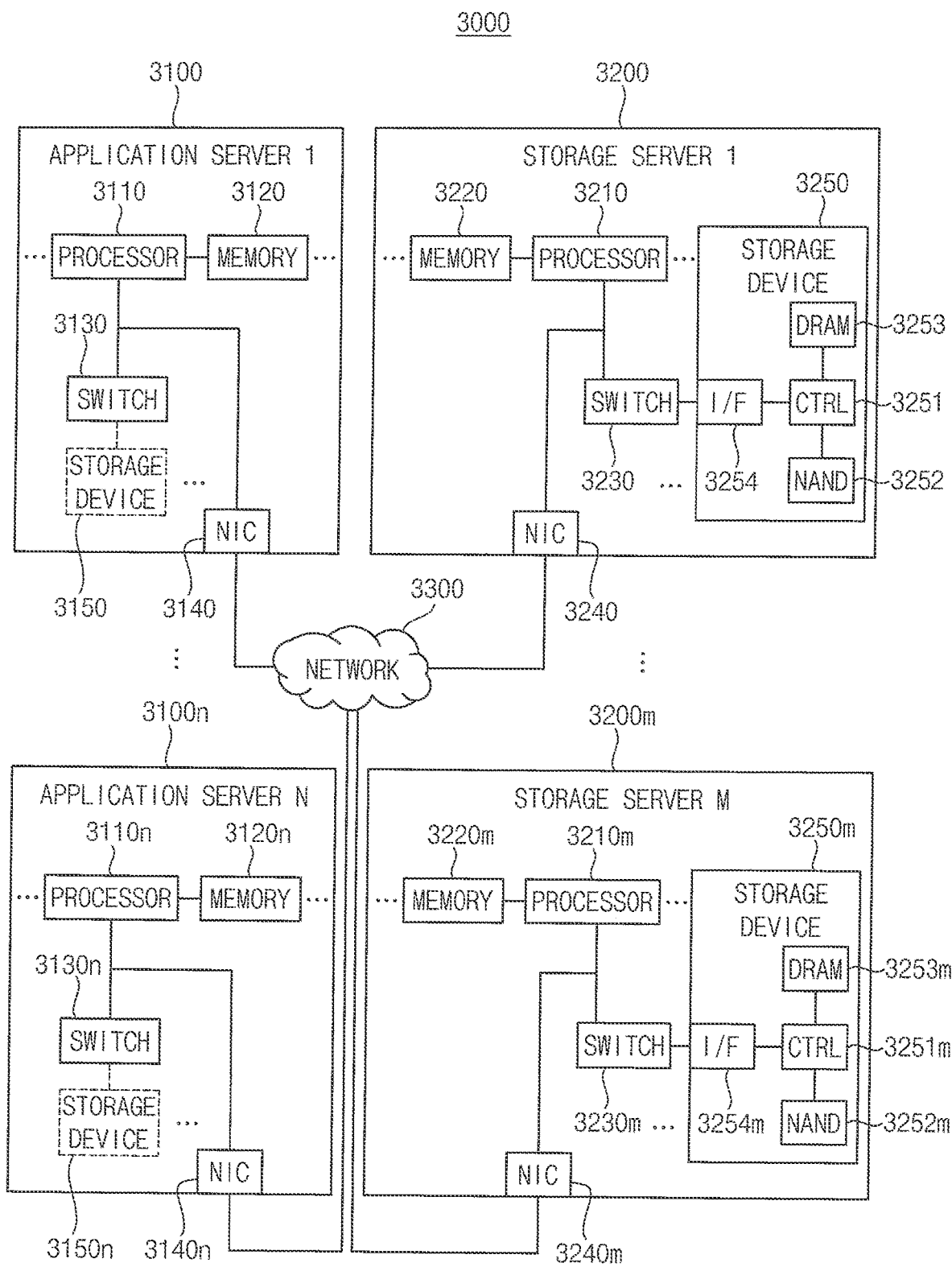
FIG. 22 is a block diagram illustrating a data center to which the storage system according to example embodiments is applied.

FIG. 22 is a block diagram illustrating a data center to which the storage system according to example embodiments is applied.

Referring to FIG. 22, a data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100n and storage servers 3200 to 3200m. The number of the application servers 3100 to 3100n and the number of the storage servers 3200 to 3200m may be variously selected according to example embodiments, and the number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, and/or a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100n and the storage servers 3200 to 3200m may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200m may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In example embodiments, the network 3300 may be a general or normal network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Thus, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the MC 3240 may be integrated with at least one of the processor 3210, the switch 3230 and the storage device 3250.

In the storage servers 3200 to 3200m and/or the application servers 3100 to 3100n, the processor may transmit a command to the storage devices 3150 to 3150n and 3250 to 3250m or the memories 3120 to 3120n and 3220 to 3220m to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150m and 3250 to 3250m may transmit a control signal and command/address signals to NAND flash memory devices 3252 to 3252m in response to a read command received from the processor. When data is read from the NAND flash memory devices 3252 to 3252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210m in the other storage server 3200m, or the processors 3110 to 3110n in the application servers 3100 to 3100n. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252. The storage devices 3150 to 3150m and 3250 to 3250m may be implemented based on the storage devices according to example embodiments described above with reference to FIGS. 1 to 21, and each of the storage devices 3150 to 3150m and 3250 to 3250m may perform the method of operating the storage device according to example embodiments.

As described above, the storage device according to example embodiments may normally process a second request corresponding to the second storage region that is not associated with the cryptographic erasure even while the cryptographic erasure with respect to the first storage region is being performed. The storage device may normally perform write/read/erase operations of data for the second storage region, thereby preventing deterioration in performance of the storage device that may occur according to the cryptographic erasure.

The inventive concept may be applied to various electronic devices and systems that include the storage devices and the storage systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a storage device including a plurality of storage regions, the method comprising:
   receiving a first request for a cryptographic erasure with respect to a first storage region among the plurality of storage regions;
   changing a first encryption key corresponding to the first storage region based on the first request, during a first time interval;
   receiving a second request comprising at least one of a write request, a read request or an erase request;
   in response to receiving the second request within the first time interval, outputting a region access signal representing whether the second request is associated with the first storage region or a second storage region other than the first storage region among the plurality of storage regions;
   in response to determining, based on the region access signal, that the second request is associated with the first storage region, holding an execution of the second request until the first time interval has elapsed; and
   in response to determining, based on the region access signal, that the second request is associated with the second storage region, executing the second request regardless of whether the first time interval has elapsed,
   wherein holding the execution of the second request comprises:
   based on the region access signal, holding an encryption of write data corresponding to the write request in response to the second request including the write request; and
   based on the region access signal, holding a decryption of read data corresponding to the read request in response to the second request including the read request.

2. The method of claim 1,
   wherein the storage device comprises a key changing table associated with the cryptographic erasure; and
   wherein the key changing table comprises:
   a plurality of address information, wherein each of the plurality of address information represents a respective storage region of the plurality of storage regions;
   a plurality of encryption keys, wherein each of the plurality of encryption keys is used to encrypt data written to a respective storage region of the plurality of storage regions; and
   a plurality of key changing bits, wherein each of the plurality of key changing bits represents whether the cryptographic erasure is being executed on data in a respective storage region of the plurality of storage regions.

3. The method of claim 2, wherein changing the first encryption key comprises:
   changing a value of a first key changing bit corresponding to the first storage region among the plurality of key changing bits based on the first request; and
   changing the first encryption key among the plurality of encryption keys to a second encryption key other than the first encryption key based on the first request.

4. The method of claim 1, wherein receiving the first request comprises:
   monitoring a submission queue doorbell register; and
   fetching, by the storage device, the first request stored in a submission queue of a host device based on a change in a value of the submission queue doorbell register.

5. The method of claim 1, wherein outputting the region access signal comprises:
   determining whether the second request is associated with the first storage region based on first address information corresponding to the first storage region and second address information corresponding to the second request; and
   generating the region access signal based on a result of the determining whether the second request is associated with the first storage region.

6. The method of claim 5, wherein determining whether the second request is associated with the first storage region comprises:
   determining that the second request is associated with the first storage region in response to at least a portion of a second address range represented by the second address information being included in a first address range represented by the first address information.

7. The method of claim 5,
   wherein the first address information comprises a first start address and a first end address of the first storage region, respectively;
   wherein the second address information comprises a second start address and a second end address of nonvolatile memories accessed by the second request, respectively; and
   wherein the determining that the second request is associated with the first storage region comprises:
   determining that the second request is associated with the first storage region in response to the second start address being lower than or equal to the first start address and the second end address being higher than the first start address, or in response to the second end address being higher than or equal to the first end address and the second start address being lower than the first end address.

8. The method of claim 1, wherein holding the execution of the second request comprises:
   based on the region access signal, holding a generation of a write command, a read command and an erase command that correspond to the write request, the read request and the erase request, respectively,
   wherein the write command, the read command and the erase command are issued from a storage controller to nonvolatile memories.

9. The method of claim 1, wherein executing the second request comprises:
   based on the region access signal, generating a write command, a read command and an erase command associated with executing the second request;
   encrypting write data corresponding to the write request in response to the second request including the write request;
   writing the write data that was encrypted to nonvolatile memories in response to the second request including the write request;
   decrypting read data corresponding to the read request in response to the second request including the read request; and
   outputting the read data that was decrypted to a host device in response to the second request including the read request.

10. The method of claim 1, further comprising:
    setting, by a host device, the plurality of storage regions based on one of a trusted computing group (TCG) protocol or a nonvolatile memory express (NVMe) protocol.

11. The method of claim 10, wherein the plurality of storage regions comprises one of a plurality of ranges based on the TCG protocol or a plurality of namespaces based on the NVMe protocol.

12. The method of claim 11, wherein the first storage region comprises one or more storage regions among the plurality of storage regions.

13. The method of claim 1, wherein the first time interval is a time interval from a first time point to a second time point, the first time point is a time point at which the first request is received, and the second time point is a time point at which a change in a value of a completion queue doorbell register is completed after the first encryption key is changed to a second encryption key.

14. A method of operating a storage system comprising a host device and a storage device connected to each other based on a nonvolatile memory express (NVMe) protocol, the storage device comprising a plurality of storage regions, the method comprising:
  issuing, by the host device, a first request for a cryptographic erasure with respect to a first storage region among the plurality of storage regions;
  changing, by the storage device during a first time interval, a first encryption key corresponding to the first storage region based on the first request;
  issuing, by the host device, a second request comprising at least one of a write request, a read request or an erase request;
  in response to receiving the second request within the first time interval, outputting, by the storage device, a region access signal representing whether the second request is associated with the first storage region or a second storage region other than the first storage region among the plurality of storage regions;
  in response to determining, based on the region access signal, that the second request is associated with the first storage region, holding, by the storage device, an execution of the second request until the first time interval has elapsed; and
  in response to determining, based on the region access signal, that the second request is associated with the second storage region, executing, by the storage device, the second request regardless of whether the first time interval has elapsed,
  wherein holding the execution of the second request comprises:
  based on the region access signal, holding an encryption of write data corresponding to the write request in response to the second request including the write request; and
  based on the region access signal, holding a decryption of read data corresponding to the read request in response to the second request including the read request.

15. The method of claim 14, wherein outputting the region access signal comprises:
  determining whether the second request is associated with the first storage region based on first address information corresponding to the first storage region and second address information corresponding to the second request; and
  generating the region access signal based on a result of the determining.

16. The method of claim 14, further comprising:
  setting, by the host device, the plurality of storage regions based on the NVMe protocol.

17. The method of claim 16,
  wherein the host device comprises a first core and a second core; and
  wherein the setting the plurality of storage regions comprises:
    setting, by the first core, a plurality of first core storage regions with respect to the storage device; and
    setting, by the second core, a plurality of second core storage regions overlapping with a portion of the first core storage regions with respect to the storage device.

18. The method of claim 17,
  wherein the issuing the first request comprises:
    issuing, by the first core, the first request to the second core storage regions, and
  wherein the issuing the second request comprises:
    issuing, by the second core, the second request to the second core storage regions.

19. A method of operating a storage device including a plurality of storage regions, the method comprising:
  receiving a first request for a cryptographic erasure with respect to a first storage region among the plurality of storage regions;
  changing a first encryption key corresponding to the first storage region based on the first request, during a first time interval;
  receiving a second request comprising at least one of a write request, a read request or an erase request;
  in response to receiving the second request within the first time interval, outputting a region access signal representing whether the second request is associated with the first storage region or a second storage region other than the first storage region among the plurality of storage regions;
  in response to determining, based on the region access signal, that the second request is associated with the first storage region, holding an execution of the second request until the first time interval has elapsed; and
  in response to determining, based on the region access signal, that the second request is associated with the second storage region, executing the second request regardless of whether the first time interval has elapsed,
  wherein holding the execution of the second request comprises at least one of:
    based on the region access signal, holding a generating of a write command, a read command and an erase command corresponding to the write request, the read request and the erase request, respectively, associated with the second request and issued from a storage controller to nonvolatile memories; or
    based on the region access signal, holding an encryption of write data corresponding to the write request in response to the second request including the write request, and holding a decryption of read data corresponding to the read request in response to the second request including the read request.

* * * * *